(12) United States Patent
Sebastian et al.

(10) Patent No.: US 12,486,109 B2
(45) Date of Patent: *Dec. 2, 2025

(54) AUTOMATED SHUTTLE APPARATUS AND METHODS OF USING THE SAME

(71) Applicant: INTELLIGRATED HEADQUARTERS, LLC, Mason, OH (US)

(72) Inventors: Jarl Nicholas Sebastian, Charlotte, NC (US); Christopher J. Hathaway, Mason, OH (US); Anthony James Turco, Liberty Township, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,321

(22) Filed: Jun. 3, 2024

(65) Prior Publication Data

US 2024/0317490 A1 Sep. 26, 2024

Related U.S. Application Data

(63) Continuation of application No. 17/643,990, filed on Dec. 13, 2021, now Pat. No. 12,024,363.

(51) Int. Cl.
*B65G 1/04* (2006.01)
*B65G 1/12* (2006.01)
(Continued)

(52) U.S. Cl.
CPC ......... *B65G 1/0414* (2013.01); *B65G 1/0478* (2013.01); *B65G 1/12* (2013.01); *B65G 1/1373* (2013.01); *G06Q 10/08* (2013.01)

(58) Field of Classification Search
CPC .. B65G 1/0435; B65G 1/0492; B65G 1/0414; B66F 9/14; B66F 9/12
See application file for complete search history.

(56) References Cited

U.S. PATENT DOCUMENTS

| | | |
|---|---|---|
| 5,927,926 A | 7/1999 | Yagi et al. |
| 9,365,347 B2 | 6/2016 | Nakamura |

(Continued)

FOREIGN PATENT DOCUMENTS

| | | |
|---|---|---|
| CN | 110282325 A | 9/2019 |
| CN | 111846814 A | 10/2020 |

(Continued)

OTHER PUBLICATIONS

European search report Mailed on Sep. 15, 2023 for EP Application No. 22205752, 8 page(s).

(Continued)

*Primary Examiner* — Kaitlin S Joerger
(74) *Attorney, Agent, or Firm* — Alston & Bird LLP

(57) ABSTRACT

Various embodiments are directed to a shuttle configured for use in an AS/RS. In various embodiments, the shuttle comprises: a first load arm and a second load arm configured to retractably extend away from a shuttle body in parallel directions, the first and second load arms each being extendable between a retracted configuration and an extended configuration; a load bed including a load area configured to receive the object; and a retractable mechanical finger provided at a distal portion of the first load arm and configured to facilitate handling of the object, the mechanical finger being hingedly connected to the first load arm using a one-way hinge component that defines a portion of the range of rotational movement of the mechanical finger relative to the first load arm and comprising a spring element (Continued)

that facilitates rotational movement of the finger between an expanded finger position and a retracted finger position.

20 Claims, 8 Drawing Sheets

(51) Int. Cl.
*B65G 1/137* (2006.01)
*G06Q 10/08* (2023.01)

(56) References Cited

U.S. PATENT DOCUMENTS

| | | |
|---|---|---|
| 9,725,238 B2 | 8/2017 | Mathys et al. |
| 11,407,587 B1 | 8/2022 | Dwivedi et al. |
| 11,708,218 B2 | 7/2023 | Kapust et al. |
| 12,024,363 B2 * | 7/2024 | Sebastian .............. B65G 1/065 |
| 2015/0321845 A1 | 11/2015 | Nakamura |
| 2017/0137221 A1 | 5/2017 | Koide |
| 2021/0284444 A1 | 9/2021 | Ranjith et al. |
| 2021/0354964 A1 | 11/2021 | Nobata et al. |
| 2022/0204271 A1 | 6/2022 | Iwata et al. |

FOREIGN PATENT DOCUMENTS

| | | |
|---|---|---|
| DE | 102005029398 A1 | 5/2006 |
| EP | 2433882 A1 | 3/2012 |

OTHER PUBLICATIONS

Final Rejection Mailed on Jan. 24, 2024 for U.S. Appl. No. 17/643,990, 10 page(s).
Non-Final Rejection Mailed on Aug. 1, 2023 for U.S. Appl. No. 17/643,990, 8 page(s).
Notice of Allowance and Fees Due (PTOL-85) Mailed on Mar. 20, 2024 for U.S. Appl. No. 17/643,990, 5 page(s).
CN Office Action Mailed on Apr. 30, 2025 for CN Application No. 202211432354, 11 page(s).
English Translation of CN Office Action dated Apr. 30, 2025 for CN Application No. 202211432354, 9 page(s).
English translation of CN Search report dated Apr. 23, 2025 for CN Application No. 202211432354, 2 page(s).
CN Notice of Allowance Mailed on Sep. 16, 2025 for CN Application No. 202211432354, 4 page(s).
English translation of CN Notice of Allowance dated Sep. 16, 2025 for CN Application No. 202211432354, 2 page(s).

* cited by examiner

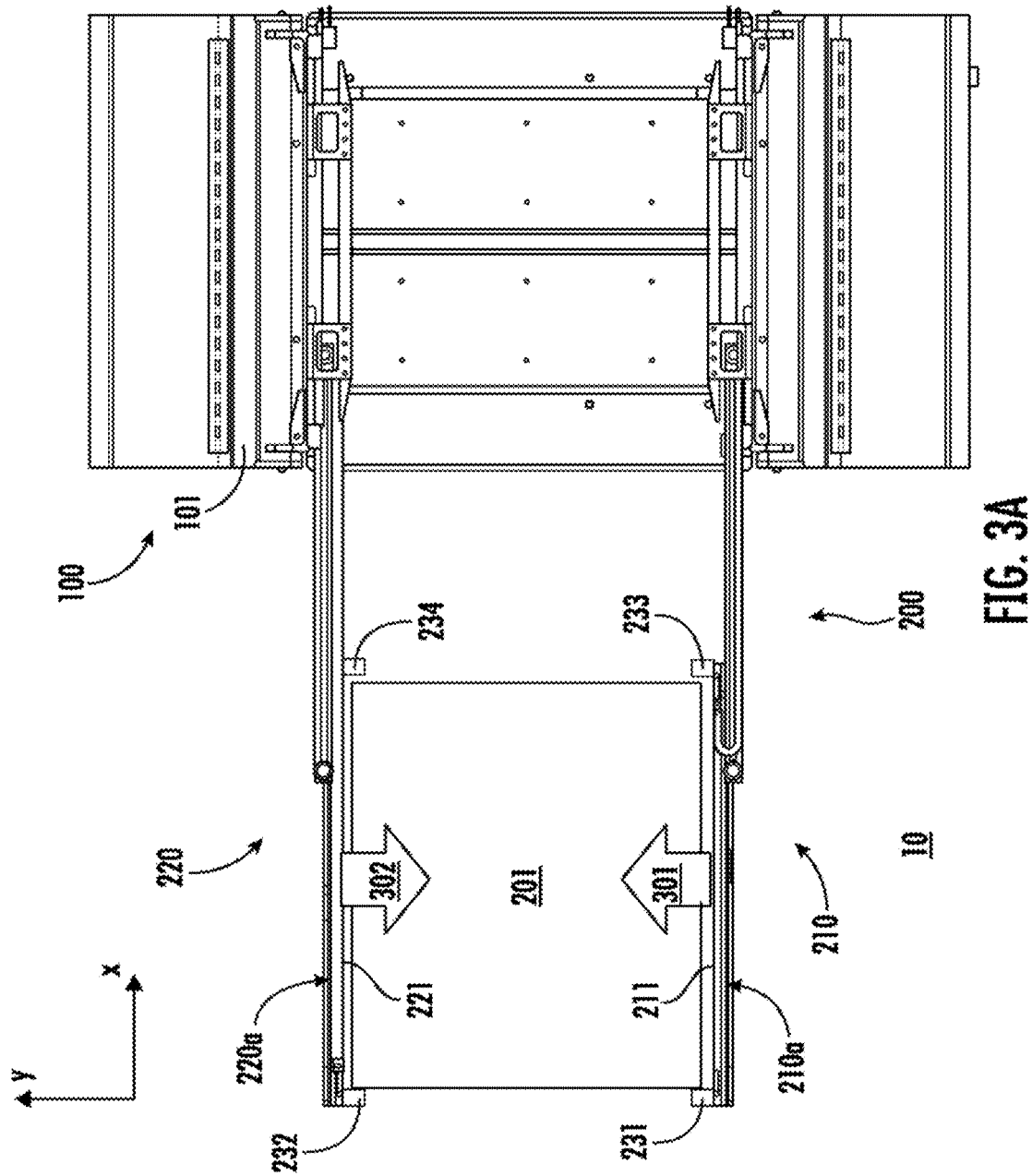

AUTOMATED SHUTTLE APPARATUS AND METHODS OF USING THE SAME

CROSS-REFERENCE TO RELATED APPLICATIONS

This patent application is a continuation of U.S. patent application Ser. No. 17/643,990, filed Dec. 13, 2021, which is incorporated herein by reference in its entirety.

FIELD OF THE INVENTION

Example embodiments of the present invention relate generally to material handling of containers, packages, discrete articles and/or other objects, and more specifically to techniques for moving objects stored at a storage rack via a shuttle.

BACKGROUND

Automated storage and retrieval systems (AS/RSs) are key components in material handling environments that utilize automation, software, and labor to optimize the productivity and throughput in a variety of operations. Furthermore, AS/RSs provide flexibility and speed allowing use in applications ranging from e-commerce and omnichannel fulfillment to article distribution. AS/RSs utilize automated shuttles moving along integrated tracks within storage racks to retrieve stored objects from discrete storage locations within those storage racks. Automated shuttles used in AS/RSs may experience challenges in effectively retrieving, handling, and/or otherwise transporting objects having a unique and/or unconventional characteristic such as, for example, size, shape, storage position, and the like. Applicant has identified several technical challenges associated with utilizing automated shuttles in an AS/RS to retrieve objects stored at discrete storage locations within a storage rack arrangement. Through applied effort, ingenuity, and innovation, many of these identified challenges have been overcome by developing solutions that are included in embodiments of the present invention, many examples of which are described in detail herein.

BRIEF SUMMARY

Various embodiments are directed to shuttles configured for use in an automated storage and retrieval system and methods of operating the same. Various embodiments are directed to a shuttle configured for use in an automated storage and retrieval system, the shuttle comprising: a plurality of retractable load arms at least partially secured relative to a shuttle body and configured to be extendable between a retracted configuration and an extended configuration, the plurality of retractable load arms comprising: a first load arm configured to extend at least substantially away from the shuttle body in a first lateral direction; and a second load arm configured to extend at least substantially away from the shuttle body in a second lateral direction that is at least substantially parallel to the first lateral direction; a load bed configured to support at least one object and comprising a width that extends between the first load arm and the second load arm, wherein at least a portion of the load bed defines a load area configured to receive the at least one object therein; a retractable mechanical finger provided at a distal portion of the first load arm and configured to facilitate handling of the at least one object, the mechanical finger being hingedly connected to the first load arm and comprising at least one spring element that facilitates rotational movement of the mechanical finger relative to the first load arm between an expanded finger position and a retracted finger position; wherein the mechanical finger is hingedly connected to the first load arm using a one-way hinge component configured to at least partially define a range of rotational movement of the mechanical finger relative to the first load arm.

In various embodiments, the mechanical finger may be configured to rotate from the expanded finger position in a retraction rotational direction at least partially towards the retracted finger position in response to a first retraction moment being imparted on the mechanical finger in the retraction rotational direction. In various embodiments, the expanded finger position may be defined by a finger length of the mechanical finger extending from the first load arm and into the load area in an at least substantially perpendicular direction relative to an arm length of the first load arm; and wherein the retracted finger position is defined by the mechanical finger being retracted into the first load arm such that the finger length of the mechanical finger extends at least substantially parallel to the arm length of the first load arm. In various embodiments, at least one spring element of the mechanical finger may be configured to bias the mechanical finger towards the expanded finger position by applying a spring force to the mechanical finger that imparts a first expansion moment on the mechanical finger in an expansion rotational direction.

In various embodiments, the shuttle may further comprise a second retractable mechanical finger provided at a second distal portion of the second load arm and configured to facilitate handling of the at least one object, the second mechanical finger being hingedly connected to the second load arm and comprising at least one second spring element that facilitates rotational movement of the second mechanical finger relative to the second load arm between a second expanded finger position and a second retracted finger position; wherein the second mechanical finger is hingedly connected to the second load arm using a second one-way hinge component configured to at least partially define a second range of rotational movement of the second mechanical finger relative to the second load arm. In certain embodiments, the at least one second spring element of the second mechanical finger may be configured to bias the second mechanical finger towards the second expanded finger position by applying a second spring force to the second mechanical finger that imparts a second expansion moment on the second mechanical finger in a second expansion rotational direction; wherein the expansion rotational direction defined by the mechanical finger and the second expansion rotational direction defined by the second mechanical finger comprise at least substantially opposite rotational directions. In various embodiments, the one-way hinge component may be defined at least in part by a vertical hinge axis such that the range of rotational movement of the mechanical finger relative to the first load arm is defined in an at least substantially horizontal plane. In certain embodiments, the at least substantially horizontal plane is at least substantially parallel the load bed. In various embodiments, the one-way hinge component may be configured to, when the mechanical finger is in the expanded finger position, prevent the mechanical finger from being rotated in an expansion rotational direction away from the retracted finger position, such that the one-way hinge component defines the rotational range of movement of the mechanical finger relative to the first load arm by at least partially restricting the range of rotational movement in the expansion rotational direction.

In various embodiments, at least a portion of the first load arm may be configured to be selectively translated in a first longitudinal direction relative to the load area so as to dynamically adjust a load width of the load area in order to facilitate handling of the at least one object disposed on the load bed. In certain embodiments, the first load arm may extend in the first lateral direction along a first guide track configured to define a first load arm travel path of the first load arm between a retracted configuration and an extended configuration, wherein at least a portion of the first guide track is defined by a non-linear feature configured to cause the at least a portion of the first load arm to exhibit a longitudinal shift in the first longitudinal direction from a first longitudinal position to a second longitudinal position as the first load arm travels along the first guide track in one of an extension direction and a retraction direction.

In various embodiments, the first load arm may comprise an arm interface portion defined by a surface of the first load arm that is positioned at least substantially adjacent the load area and faces the second load arm so as to be configured for physical engagement of the at least one object disposed within the load area to at least partially secure the at least one object within the load area; wherein the arm interface portion is made of a high-traction material. In various embodiments, the shuttle may further comprise a second mechanical finger extending from the first load arm into the load area in a second longitudinal direction at least substantially parallel to the at least substantially perpendicular direction relative to the first load arm; wherein the mechanical finger is positioned at least substantially adjacent a first lateral side of the load bed and wherein the second mechanical finger is positioned at least substantially adjacent a second lateral side of the load bed. In various embodiments, the shuttle may further comprise a second mechanical finger configured to facilitate handling of the at least one object, the second mechanical finger extending from the second load arm into the load area in an at least substantially perpendicular direction relative to the second load arm; wherein the mechanical finger is positioned at least substantially adjacent a first lateral side of the load bed and wherein the second mechanical finger is positioned at least substantially adjacent a second lateral side of the load bed.

Various embodiments are directed to a shuttle configured for use in an automated storage and retrieval system, the shuttle comprising: a plurality of retractable load arms at least partially secured relative to a shuttle body and configured to be extendable between a retracted configuration and an extended configuration, the plurality of retractable load arms comprising: a first load arm configured to extend at least substantially away from the shuttle body in a first lateral direction; and a second load arm configured to extend at least substantially away from the shuttle body in a second lateral direction that is at least substantially parallel to the first lateral direction; a load bed configured to support at least one object and comprising a width that extends between the first load arm and the second load arm, wherein at least a portion of the load bed defines a load area configured to receive the at least one object therein; a mechanical finger provided at a distal portion of the first load arm and configured to facilitate handling of the at least one object, the mechanical finger extending from the first load arm into the load area in an at least substantially perpendicular direction relative to the first load arm; wherein at least a portion of one or more of the first load arm and the second load arm is configured to be selectively translated in a first longitudinal direction relative to the load area so as to dynamically adjust a load width of the load area in order to facilitate handling of the at least one object disposed on the load bed.

In various embodiments, the mechanical finger may comprise an at least substantially rigid configuration. In various embodiments, the shuttle may further comprise a second mechanical finger provided at a second distal portion of the second load arm and configured to facilitate handling of the at least one object, the second mechanical finger extending from the second load arm into the load area in an at least substantially perpendicular direction relative to the second load arm and comprising an at least substantially rigid configuration; wherein at least a portion of the first load arm and at least a portion of second load are configured to be selectively translated in the first longitudinal direction and a second longitudinal direction relative to the load area, respectively, so as to dynamically adjust the load width of the load area in order to facilitate handling of the at least one object disposed on the load bed.

In various embodiments, the mechanical finger may comprise an at least partially retractable configuration defined by a range of relative linear movement between the mechanical finger and the first load arm, wherein the mechanical finger is configured to at least partially retract from an expanded finger position in a longitudinal retraction direction towards a retracted finger position based at least in part on a pushing force applied to the mechanical finger from the at least one object disposed within the load area. In certain embodiments, the mechanical element may further comprise at least one spring element that facilitates linear movement of the mechanical finger relative to the first load arm between the expanded finger position and the retracted finger position, the spring element being configured to bias the mechanical finger towards the expanded finger position by applying a spring force to the mechanical finger in the at least substantially parallel direction relative to the first load arm. In various embodiments, the shuttle may further comprise a second mechanical finger configured to facilitate handling of the at least one object, the second mechanical finger extending from the second load arm into the load area in an at least substantially perpendicular direction relative to the second load arm; wherein the mechanical finger is positioned at least substantially adjacent a first lateral side of the load bed and wherein the second mechanical finger is positioned at least substantially adjacent a second lateral side of the load bed.

BRIEF DESCRIPTION OF THE DRAWINGS

Reference will now be made to the accompanying drawings, which are not necessarily drawn to scale, and wherein:

FIGS. 3A-3C illustrate various top views of exemplary shuttle apparatuses according to various embodiments described herein;

DETAILED DESCRIPTION

Figure 1:
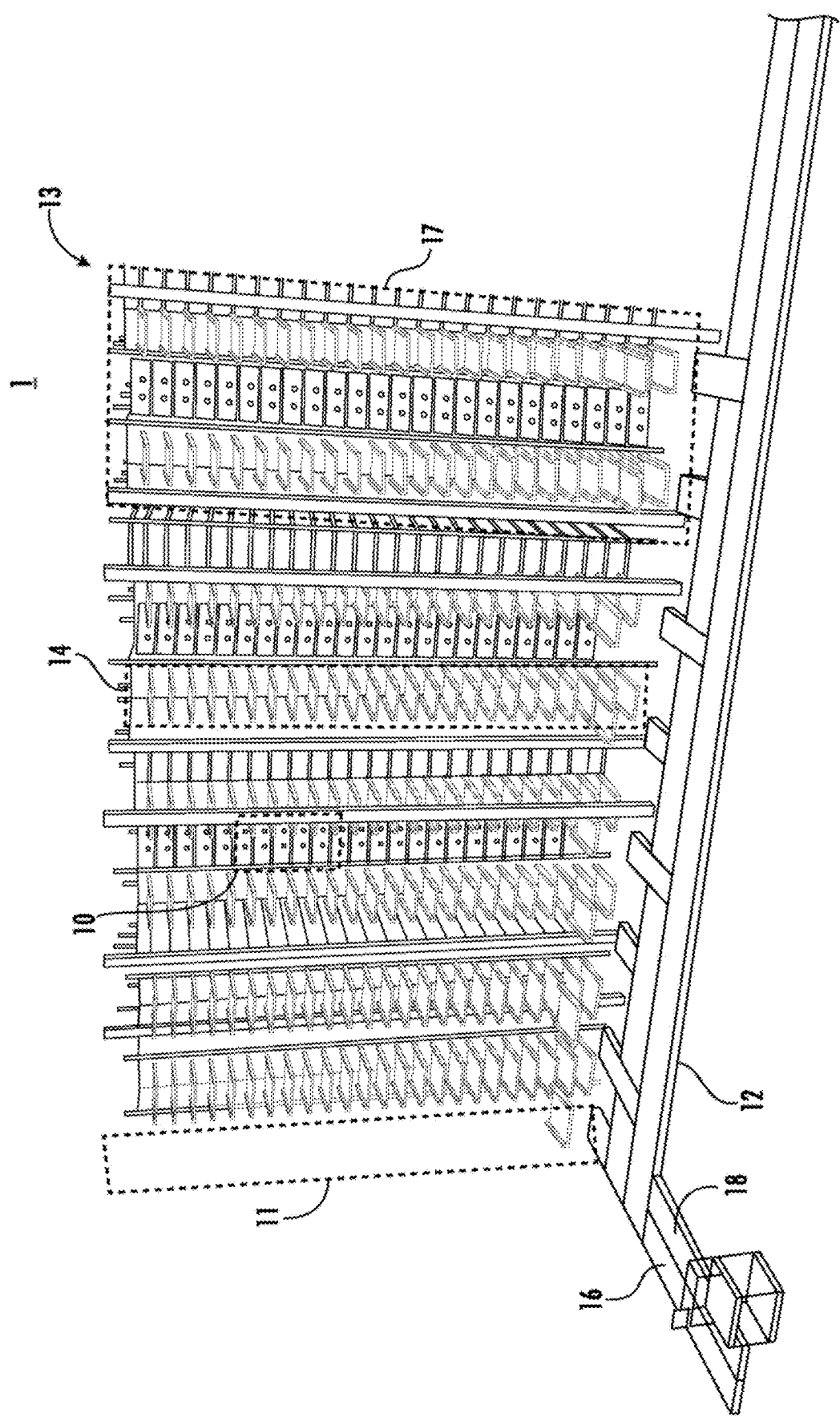
FIG. 1 illustrates a schematic view of an exemplary automated storage and retrieval system according to various embodiments described herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

The words "lateral," longitudinal," and "vertical," when used herein, are intended to be used for referential and/or illustrative purposes in order to provide context for one or more aspects of the present invention, and should be strictly interpreted as being limited a particular universal direction. By way of non-limiting example, as described herein with reference to the directional references provided in the figures, the "lateral" direction may extend along an x-axis, a "longitudinal" direction may extend perpendicularly within at least substantially the same plane as a lateral direction, such as, for example, along a y-axis, and a "vertical" direction may extend perpendicularly within an at least substantially perpendicular plane relative to both the lateral and longitudinal directions, such as, for example, along an a z-axis.

The components illustrated in the figures represent components that may or may not be present in various embodiments of the invention described herein such that embodiments may include fewer or more components than those shown in the figures while not departing from the scope of the invention.

Automated storage and retrieval systems may utilize various material handling products such as various carriages, carts, lifts, conveyors, and/or the like to facilitate the transportation of objects to a desired delivery location within a factory or a warehouse. For example, automated shuttles may be used to transport objects to and/or from various storage locations organized along storage aisles arranged within a storage environment. To retrieve a stored object from a stored location within an AS/RS, automated shuttles may be transported to the storage location, where automated shuttles are often configured to utilize various electronically-driven components disposed on the shuttle to physically retrieve the stored object from within the storage location. For example, to extract an object from a storage location, shuttles in AS/RSs may use electronically-driven motors to deploy various electronically-actuated retention elements (e.g., hooks, fingers, and/or the like) connected to an extendable load arm that is extended from the shuttle into the storage location such that the electronical retention elements disposed about a distal end of the load arm may interface the stored object. Various shuttles utilize actuatable fingers provided on the distal end of the extendable load arm that are driven by electronic motors such that they may be selectively controlled, such as, for example, extended and retracted, to avoid unwarranted physical interference with the object stored in the storage location, which may cause object misalignment that can lead to operational efficiencies and even system failures. Automated shuttles that operate using such motor-driven control systems or electronic retrieval components exhibit extremely high manufacturing costs and are often plagued by an increased amount of part and/or system failures resulting from the configuration of such electronic and/or motor-driven instruments on inherently dynamic parts of an automated shuttle, such as, for example, along a load arm. The use of electronically controlled retrieval components in an automated shuttle requires the use of a large amount of wires, cables, sensors, motors, and/or the like, each of which is required to be connected back to the shuttle. Not only does such a configuration introduce a vast array of complexities into the design of the shuttle, but it drastically increases the part costs and maintenance costs required to maintain the operation of the shuttle over the life of the product.

The present invention relates to a shuttle configured for use in an AS/RS that comprises a material handling assembly comprising a retractable mechanical finger provided at a distal portion of load arm and configured to facilitate handling of an object stored within the AS/RS. In various embodiments, the present invention comprises a shuttle including at least one retractable load arm configured to extend into a storage location to facilitate the retrieval of an object stored therein. In various embodiments, the exemplary shuttle comprises at least one mechanical finger that is hingedly connected to a distal end of the load arm using a one-way hinge component configured to at least partially define a range of rotational movement of the mechanical finger relative to the load arm. The hinged configuration of an exemplary mechanical finger enables the mechanical finger to, upon physically engaging an object within a storage location, rotate about the hinge axis towards a retraction position so as to at least substantially mitigate the amount of unwarranted physical interference between the mechanical finger and the stored object as the load arm is extended into the storage location. Further, the exemplary shuttle described herein comprises a mechanical finger that includes a one-way hinge component that enables the aforementioned configuration wherein the mechanical finger is capable of evading problematic premature engagement with the stored object, while maintaining the functionality of the mechanical finger with respect to the handling of a stored object and/or securing of a captured object within a load area during a retrieval operation. Further, the exemplary shuttle described herein comprises a mechanical finger that comprises a spring-loaded configuration enabled by at least one spring element configured to facilitate the arrangement of an exemplary mechanical finger in a repeatable, reliable arrangement for serial operation in an AS/RS.

As described herein, the present invention includes a shuttle apparatus configured for use in an AS/RS, including a material handling assembly that at least substantially minimizes the reliance on electronic retrieval elements and motor-driven components disposed along the load arm for use in a retrieval operation. The present invention utilizes, for example, mechanical fingers designed to maintain the function provided with electronic control systems, while at least substantially minimizing the maintenance costs, product costs, operational inefficiencies, and unnecessary design complexities associated within such systems. In particular, the present invention minimizes the costs associated with operation of the shuttle and embodies a robust design deliberately configured to avoid the physical and operational inefficiencies associated with various shuttles that rely on complex and highly sensitive electronic control elements that are disposed within an inherently dynamic shuttle components that are serially reconfigured throughout the life of the shuttle.

FIG. 1 illustrates a material handling system that includes an automated storage and retrieval system (AS/RS) 1. A storage rack 13 of the AS/RS 1 may be defined as a series of vertically arranged shelves, each supported by a support frame. The support frame may comprise vertical support members separating various levels within the storage rack 13, and horizontal support members supporting individual shelves. Each shelf may define and/or comprise one or more bay, each bay may encompass a plurality of storage locations configured for storing at least one object (e.g., a storage container, a product, a spool, and/or other object configurations) therein. In various embodiments, an AS/RS 1 may define one or more aisles 17 defined between two adjacent storage racks 13 with one or more shuttles 10 defined therein to remove and/or place objects into storage locations within the storage rack. As shown, the objects may be moved between different levels via lifts 11 and/or to and from pick-up and drop-off stations 14. In an example embodiment, the objects may be received by the system at pick-up and drop-off stations 14 from the in-feed conveyor 16 via the product delivery system 12 and a corresponding lift interface. In various embodiments, the objects may be removed from the AS/RS via pick-up and drop-off stations 14, which pass the object to the product delivery system 12, then the lift interface, and finally to the out-bound conveyor 18.

In various embodiments, a storage rack 13 may be provided with objects via in-feed conveyors 16 for storage. In various embodiments, the storage rack 13 may define multiple levels connected via vertical lifts 11 configured to move objects between the in-feed and out-feed conveyors 16, 18 to an appropriate level of the storage rack 13. The vertical lifts 11 have a vertical support structure positioned proximate to the storage rack 13 to pick up and to deposit objects at selected levels within the storage rack 13. The vertical lifts 11 may be secured to the racks and transport objects between conveyors defined on different levels.

As described herein, in various embodiments, each shelf within a storage rack 13 of an AS/RS 1 may comprise a storage location. For example, each level of a storage rack 13 may be divided into storage locations which may be defined as a physical space on the shelf where an object may be stored. For example, in various embodiments, an object may be any type of container used in an AS/RS, such as a carton, a case, a tote, a divided tote, a tray, a pallet, or the like. In various embodiments, as discussed herein the storage location may be defined by a storage depth and a storage width configured such that the storage location is capable of holding one or more objects. Various shelves may have various configurations with storage locations having different sizes and/or depths based on the given configuration (e.g., the size and shape of a given object).

In various embodiments, the AS/RS 1 may comprise at least one automated shuttle 10 configured to travel along a shuttle guide track provided within one or more aisle 17, racks 13, and/or the like of the AS/RS Ito facilitate the retrieval, storage, and/or transportation of various objects throughout the AS/RS 1. For example, in order to remove and/or place objects into various storage locations of a storage rack 13, the AS/RS 1 may use a shuttle 10 configured to retrieve an object from the storage rack 13 (e.g., the storage location), as described herein. In some embodiments, the shuttle 10 may be disposed between two storage racks 13, such that the shuttle may retrieve one or more objects in any storage location of the two storage racks 13 along a given level (e.g., a load arm(s) of a shuttle may extend towards either of the two storage racks 13). For example, two adjacent storage racks may be separated sufficiently to allow the shuttle to move therebetween. Further, an exemplary storage location defined within a storage rack 13 may be configured such that an object stored therein may be retrieved, disposed, and/or otherwise engaged by an exemplary shuttle 10.

Figure 2:
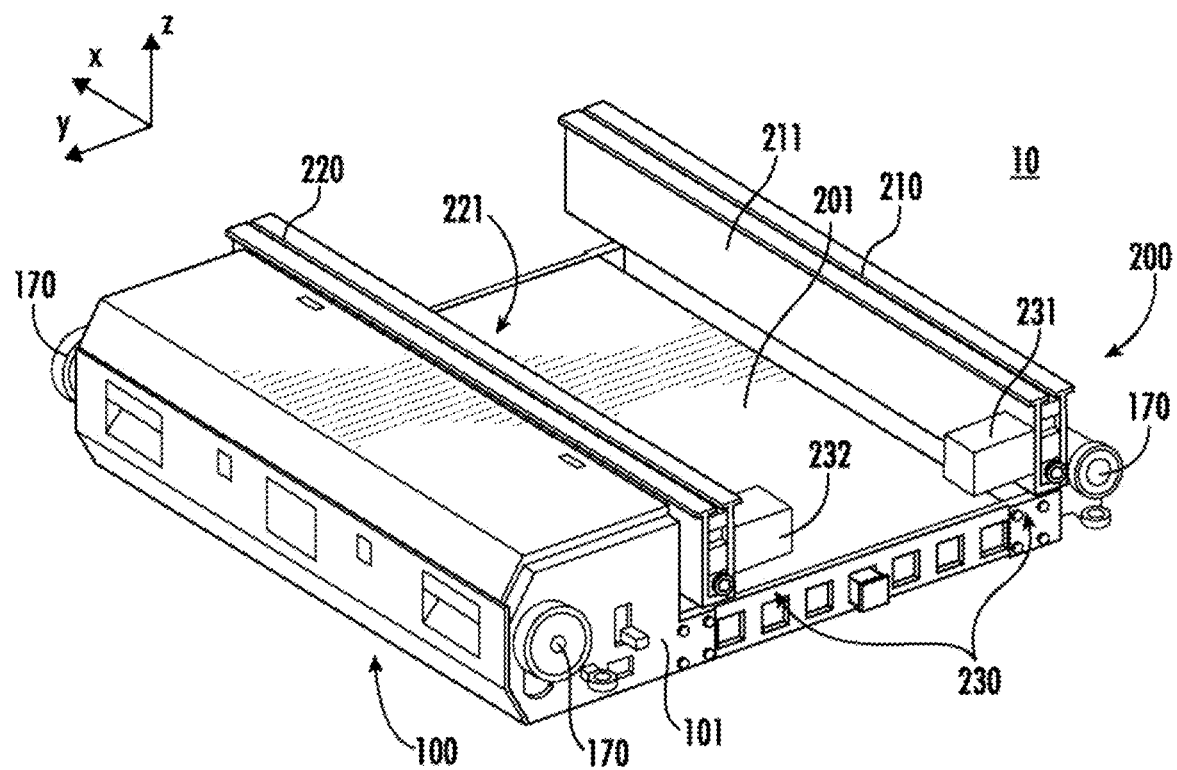
FIG. 2 illustrates a perspective view of an exemplary shuttle apparatus according to various embodiments described herein.

As a non-limiting example, FIG. 2 illustrates an exemplary shuttle according to various embodiments described herein. In particular, FIG. 2 illustrates an exemplary shuttle 10 configured to facilitate storage and/or retrieval of an object within an AS/RS 1 by handling the object and transporting the object to and/or from a storage location within the AS/RS 1. For example, as described herein, an exemplary shuttle 10 may be configured to retrieve an object from a storage location within an exemplary AS/RS 1, transport the retrieved object to another second storage location within the AS/RS 1, and provide (e.g., dispense) the object at the second storage location. For example, in various embodiments, an exemplary shuttle may comprise a base assembly 100 comprising a shuttle body 101, one or more transportation components, such as, for example, a drive motor and one or more wheels 170 to enable the shuttle 10 to move along a shuttle guide track within the AS/RS 1 via the drive motor, and/or one electronic components configured to facilitate electronic communication of one or more power signals, instructional signals, informational signals, and/or the like between the various electronic components of the shuttle 10 and/or other computing devices associated with the AS/RS 1, as well as a material handling assembly 200 configured to facilitate the handling (e.g., the retrieval and/or disposal) of an object by the shuttle 10.

In various embodiments, the shuttle 10 may be any type of one-level shuttle (OLS) vehicle typically used in a AS/RS, such as a shuttle, a carrier, a bot, and/or the like. In various embodiment, the shuttle 10 may be a self-contained unit, receiving power (e.g., 48 VDC) from a bus bar located inside the shuttle guide track that may be mounted to the storage rack. In various embodiments, the power guide track (e.g., 48 VDC power supplied to the track) may be powered from a DC power panel. In various embodiments, a single DC power panel can power a plurality of shuttles (e.g., up to six shuttles). In various embodiments, the shuttle 10 may receive control system commands over a Wireless Local Area Network (WLAN). In various embodiments, at least one shuttle 10 may be disposed along each level of the storage rack 13. As such, the shuttle(s) 10 may be configured to move along the aisle of a storage rack 13 via a shuttle guide track extending along the length thereof, such as, for example, via the one or more wheels 170 of the base assembly 100. In various embodiments, the shuttle guide track may be affixed to at least a portion of the storage rack 13. Alternatively, or additionally, it should be understood that any of a variety of movement mechanisms may be utilized for moving a shuttle 10 (e.g., belt-drive systems, magnetic movement mechanisms, chain-drive systems, and/ or the like). Moreover, it should be understood that the movement mechanisms may be defined within the shuttle 10 (e.g., a motor positioned on the shuttle) or within the storage rack 13 (e.g., motors within the storage rack). In various embodiments, the shuttle(s) 10 may be configured with sensors configured move to an intended storage location and/or engage with an object in a given storage location. For example, the shuttle 10 may be equipped with a proximity sensor to determine the location of the shuttle 10 along the aisle of the storage rack 13 or to determine the depth of a given object within a storage location. In various embodiments, the shuttle 10 may also be equipped with sensors and onboard devices, such as Wi-Fi antenna for communication with a Warehouse Control System (WCS), overload protection, one or more power supplies (e.g., 24 Volt power supply and/or 48 volt power supply), digital input and output modules, and/or the like.

In various embodiments, a materials handling assembly may comprise an object load bed and one or more retractable load arms configured to extend into a storage location and defined at least in part by an arm interface portion configured to engage an object. Further, in various embodiments, the one or more load arms may include at least one mechanical finger provided at a distal end of the load arm (e.g., at a distal end of the outer arm element thereof) and configured to at least partially protrude from an inward-facing surface of the load arm, so as to function as a physical barrier at least partially restricting the movement of an object disposed on the load bed of the shuttle.

As a non-limiting example illustrated in FIG. 2, the material handling assembly 200 of an exemplary shuttle 10 may comprise an object load bed 201, a plurality of load arms comprising a first load arm 210 and a second load arm 220. As shown, the exemplary shuttle 10 further comprises a plurality of mechanical fingers 230 comprising a first mechanical finger 231 provided at the distal end of the first load arm 210 and a second mechanical finger 232 provided at the distal end of the second load arm 220, the first and second mechanical fingers 231, 232 each being defined by a respective length that extends from an inward-facing surface of the respective load arm (e.g., the arm interface portion of the outer arm element, as described herein) in an inward longitudinal direction (e.g., towards the central width axis of the load bed 201) at least partially towards the opposing load arm.

In various embodiments, shuttles 10 discussed herein may define an object load bed 201 defined by a surface, such as, for example, an at least substantially horizontal surface, upon which an object may be held by a shuttle 10 during a retrieval operation and/or storage operation being executed by the shuttle 10. The shuttle may define an object load bed 201 (shown in at least FIG. 2, for example) defined between at least a portion of two opposing load arms (e.g., two opposing arm interface portions), as described herein. The object load bed defines a floor configured to support the object(s) during movement. The load bed 201 of an exemplary shuttle 10 may be defined at least in part by a width extending in a longitudinal direction (e.g., in the y-direction, as illustrated) between the opposing load arms load arms, and a depth extending in a lateral direction (e.g., in the x-direction, as illustrated). In various embodiments, the load bed 201 may define a load area defined as the portion of the load bed upon which an object may be disposed. For example, as described in further detail herein, the load area may be selectively increased and/or decreased by translating one or more of the retractable load arms in the longitudinal direction.

Further, in various embodiments, the material handling assembly 200 of an exemplary shuttle 10 may comprise a first load arm 210 and a second load arm 220, each having a retractable configuration (e.g., a telescoping configuration, a sequential sliding configuration, and/or the like) so as to be extendable between a retracted configuration, as illustrated in the exemplary embodiment shown FIG. 2, and an extended configuration wherein the load arm is extended in an outward direction away from the shuttle body 101 to enable the load arm to enter a given storage location (e.g., for retrieval and/or storage of an object). In various embodiments, a load arm may comprise a plurality of interconnected arm elements secured relative to one or more other arm elements such that the relative motion therebetween defines the extension and/or retraction of the load arm between the retracted and extended configurations. In various embodiments, the configuration (e.g., dimensions) of the plurality of arm elements may be based at least in part on the configuration of the AS/RS (e.g., the shuttle racks 13 and/or the storage location(s) defined therein), so as to ensure that the shuttle 10 can operably access an object provided within a storage location. For example, the plurality of arm elements of an exemplary load arm may include an outer arm element that is defined by the arm element of the plurality that defines the distal end of the load arm when configured in the extended configuration (e.g., the arm element that positioned furthest away from the shuttle body 101 when the load arm is in an extended configuration). As described herein, an outer arm element is defined at least in part by an arm element length that extends in a lateral direction (e.g., in the x-direction, as illustrated in FIG. 2) along one side of the load bed 201. For example, in various embodiments, material handling assembly 200 may be configured such that the outer arm element of a load arm may be secured in an adjacent position relative to a side of the load bed 201, extending along the width of the load bed 201. As illustrated in FIG. 2, the first load arm 210 the exemplary shuttle 10 is defined in part by a first outer arm element 210a and the second load arm 220 is defined in part by a second outer arm element 220a. As shown, the first outer arm element 210a and the second outer arm element 220a are provided on opposing sides of the object load bed 201, each extending along the width thereof.

Further, in various embodiments, the outer arm element (e.g., first outer arm element 210a, second outer arm element 220a) of a retractable load arm may comprise an arm interface portion that is configured to physically engage an object so as to at least partially constrain the movement of the object relative to the shuttle 10 in one or more directions in order to facilitate handling and/or transportation of the object. As described herein, in various embodiments, an arm interface portion may comprise a surface of configured to interact with an object during a retrieval operation and/or dispense operation to at least partially maintain the position of an object on the load bed as the one or more load arms move between the retracted and extended configurations. As described in further detail herein, in various embodiments, the arm interface portion of an exemplary load arm may comprise an at least substantially rigid surface defined at least in part by a substantially rigid material, such as, for example, one or more ferrous metals, one or more non-ferrous metals, a high-density plastic (e.g., UHMW, Delrin, Nylon), and/or the like. Additionally, or alternatively, in various embodiments, arm interface portion of an exemplary load arm may comprise an at least substantially compliant surface defined at least in part by a substantially flexible material, such as, for example, a rubber, an open-cell foam, a closed-cell foam, and/or the like. Further, in various embodiments, as described herein, at least a portion of the arm interface portion of a load arm may comprise a high-traction surface defined by a slip-resistant, adhesive, and/or otherwise friction-inducing material configured to resist the movement of an object abutted thereagainst relative to the load bed 201, such as, for example, a rubber, a friction tape, and/or any other applicable material having a substantially high coefficient of friction. In various embodiments, such an exemplary high-traction surface may be defined by a surface comprising one or more geometric features, such as, for example, ribs, grooves, and/or the like, provided thereon that is configured to increase the resistance realized by an object engaged with the high-traction surface.

For example, the exemplary first outer arm element 210*a* of the first load arm 210 of the exemplary shuttle shown in FIG. 2 comprises a first arm interface portion 211 that is defined by the inward-facing surface (e.g., facing toward the load area defined by the load bed 201) provided along the length of the first outer arm element 210*a*. As shown, the first and second outer arm elements 210*a*, 220*a* of the first and second load arms 210, 220 may extend along opposing ends of the load bed 201 in an at least substantially parallel configuration (e.g., in a lateral direction along the width of the load bed 201) such that the first arm interface portion 211 and the second arm interface portion 212 are configured to face one another. As described herein, the load width of an exemplary shuttle 10 may be defined by the operable width along the load bed between the first load arm 210 and the second load arm 220 within which an object may be received. In such an exemplary circumstance, for example, the load width of an exemplary shuttle 10 at a particular instance may be defined by the perpendicular distance between the first arm interface portion 211 and the second arm interface portion 212 (e.g., as measured in the longitudinal direction).

In various embodiments, wherein an exemplary load arm comprises a plurality of interconnected arm elements arranged in a retractable configuration, as described herein, a retracted configuration may embody an arrangement wherein each of the plurality of arm elements is disposed in a fully retracted position relative to the adjacent arm element secured thereto such that each of the plurality of arm elements is positioned at least substantially within the shuttle body 101. Further, in various embodiments, an extended load arm configuration may be defined by each of the plurality of arm elements being in a fully extended position (e.g., defined by minimal overlap along the respective lengths of the elements) relative to the adjacent arm element secured thereto such that at least a portion of the plurality of arm elements of the load arm is extended at least substantially beyond the shuttle body 101 of the shuttle 10. As an illustrative example, an exemplary shuttle 10 may execute a retrieval operation with respect to an object at a storage location by being transported through an AS/RS to a position that is at least substantially aligned with the storage location, extending a first load arm 210 and a second load arm 220 from a retracted configuration to an extended configuration in at least substantially simultaneous manner so as to cause interaction between the object and the load bed 201 (e.g., such that the object is disposed on the load bed 201), and retracting the first and second load arm from the extended configuration back to the retracted configuration such that the object on the load bed 201 is arranged on top of the shuttle body 101 for transportation throughout the AS/RS (e.g., to a destination location).

In various embodiments, the materials handling assembly 200 of an exemplary shuttle 10 may comprise a retractable load arm comprising a mechanical finger disposed at a distal end thereof (e.g., at a distal end of the outer arm element) and having a length that extends from the corresponding outer arm element in an inward longitudinal direction (e.g., into the load area). As an illustrative example, the exemplary shuttle 10 comprises a plurality of mechanical fingers 230, including a first mechanical finger 231 provided at a distal end of the first load arm 210 and a second mechanical finger 232 provided at a distal end of the second load arm 220. For example, in various embodiments, the first and second mechanical fingers 231, 232 may each be configured to, as the respective load arm to which it is attached is being retracted from an extended configuration towards a retracted configuration as part of a retrieval operation, physically engage at least a portion of an object disposed on the load bed 201 so as to cause the object to move with the load arms 210, 220 back towards the shuttle body 101. As illustrated, the first and second mechanical fingers 231, 232 protruding from the first and second arm interface portions 211, 221, respectively, in opposing inward directions (e.g., each into the load area) may facilitate the retrieval operation of the shuttle 10 by functioning as a dynamic physical barriers that move along with the respective load arm 210, 220 so as to cause the object being retrieved to be retained within the load area on the load bed 201 throughout the movement of the load arms 210, 220 from the extended configuration to the retracted configuration.

As described in further detail herein a mechanical finger provided at an end of an exemplary load arm may comprise an at least substantially rigid protrusion configured to remain in a fixed position relative to the load arm from which it extends. Additionally, or alternatively, in various embodiments, an exemplary mechanical finger may have an at least partially retractable configuration such that the mechanical finger may be at least partially retracted toward the load arm (e.g., the outer arm element) to which the finger is secured based at least in part on the finger physically engaging at least a portion of an object disposed in the load area on the load bed 201. For example, in various embodiments, an exemplary retractable mechanical finger may be hingedly connected to a retractable load arm using a one-way hinge component configured to at least partially define a range of rotational movement of the mechanical finger relative to the load arm. Further, in various embodiments, an exemplary retractable mechanical finger may be connected to a retractable load arm and configured for linear retraction and/or expansion into and/or out of the load arm along a range of linear movement defined in a perpendicular direction relative to the arm interface portion of the load arm. As described in further detail herein, various mechanical fingers comprising an at least partially retractable configuration to facilitate efficient execution of a retrieval and/or storage operation within an AS/RS may comprise a spring-loaded configuration wherein at least one spring element of the mechanical finger is configured to facilitate the arrangement of an exemplary mechanical finger in a repeatable, reliable manner for operation in an automated storage and retrieval system.

Figure 3B:
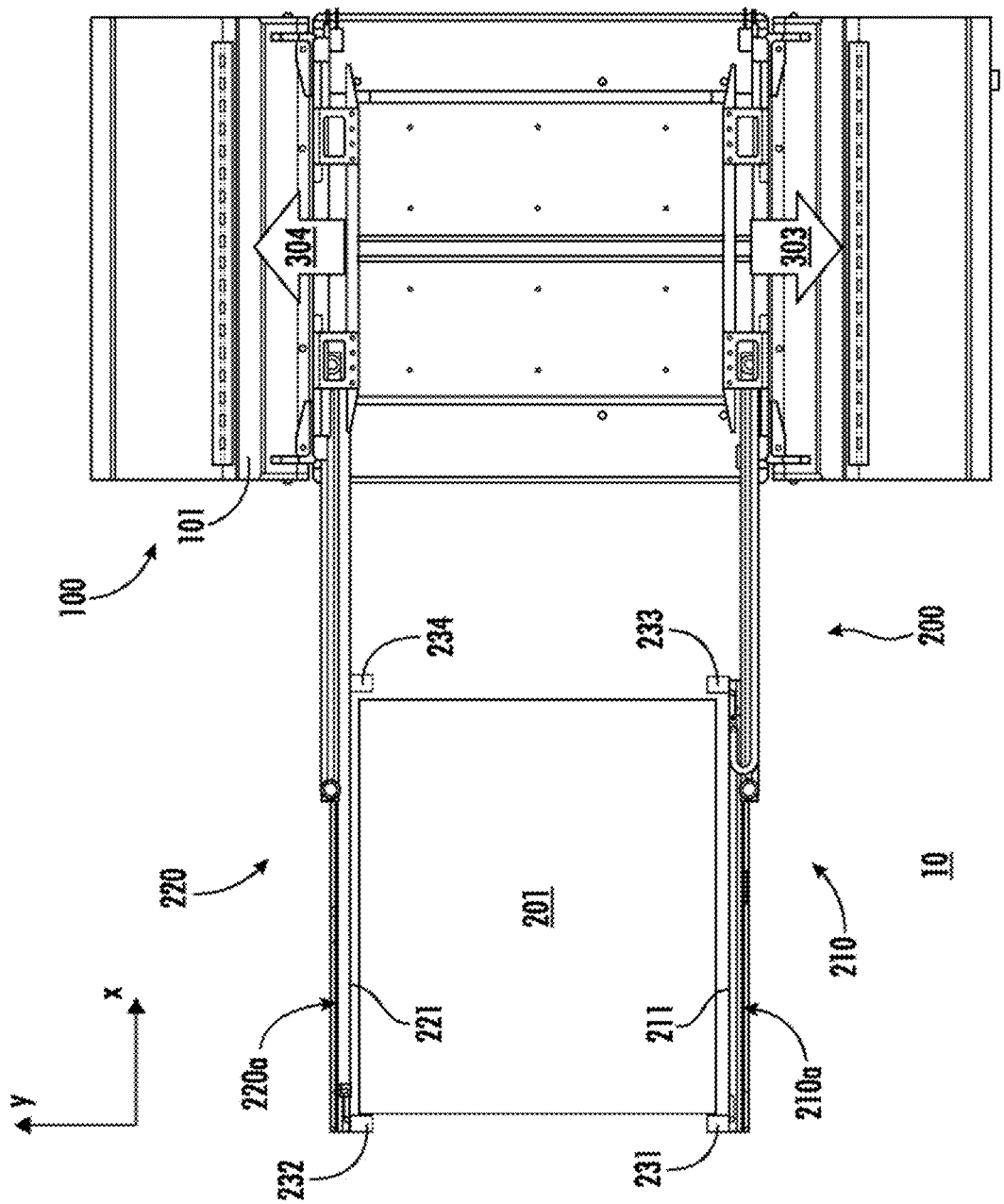
Figure 3C:
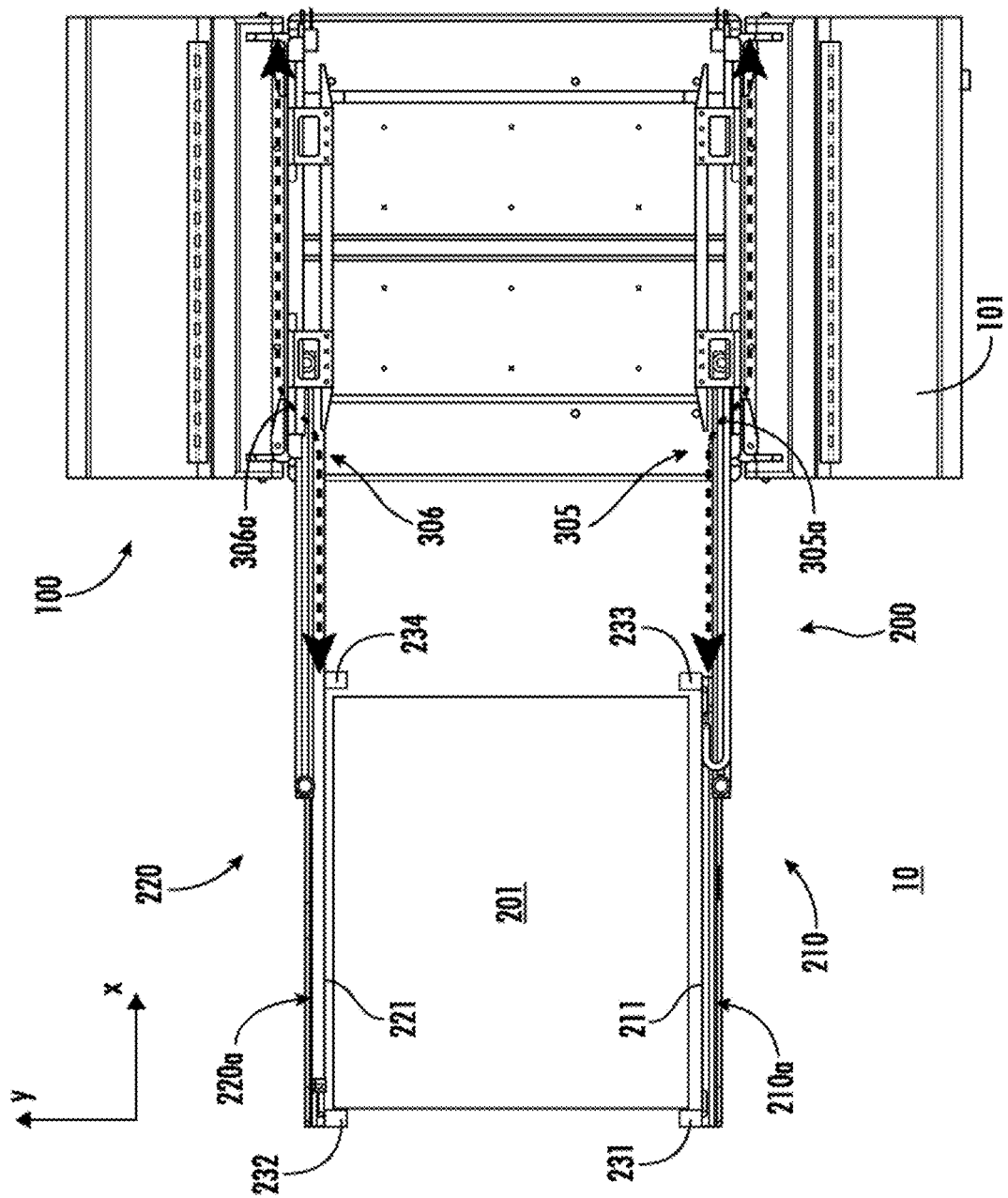

FIGS. 3A-3C illustrate various top views of exemplary shuttles configured for use in an AS/RS according to various embodiments described herein. In particular, FIG. 3A illustrates an exemplary shuttle 10 comprising a first load arm 210 and a second load arm 220, each configured to be moveable in a longitudinal direction (e.g., a y-direction, as illustrated) in order to selectively increase and/or decrease the load width of the material handing assembly 200 during a retrieval and/or storage operation. The material handling assembly 200 of the illustrated shuttle 10 includes a plurality of mechanical fingers comprising a first mechanical finger 231 positioned at the distal end of the first load arm 210 and a second mechanical finger 232 positioned at the distal end of the second load arm 220. As described herein, both the first and second mechanical fingers 231, 232 comprise rigid elements extending from a respective arm interface portion 211, 221 of a load arm 210, 220 in an inward direction into the load area.

In various embodiments, the shuttle 10 may be configured to execute a retrieval operation by extending the first and second load arms 210, 220 of the shuttle 10 from a retracted configuration an outward lateral direction (e.g., in the negative x-direction, as illustrated) away from the shuttle body 101 towards a storage location containing a stored object. As shown, in various embodiments, each load arm 210, 220 may be extended towards an extended configuration by moving the interconnected arm elements thereof relative to one another along an at least substantially linear guide track configured to cause the load arm to extend in an at least substantially linear (e.g., lateral) direction. For example, in an exemplary circumstance wherein the material handling assembly 200 of a shuttle 10 comprises rigid mechanical fingers 231, 232 protruding from respective load arms 210, 220 into the load area, such as, for example, the exemplary shuttle illustrated in FIG. 3A, the first and second load arms 210, 220 extend in parallel linear directions such that the respective arm interface portions 211, 221 are separated by a longitudinal distance that is at least substantially greater than the width of the stored object in the storage location. That is, as the first and second load arms 210, 220 are extended into the storage location and the first and second mechanical fingers 231, 232 pass the object stored therein, the load width defined by the separation distance between the first and second arm interface portions 211, 221 is sufficiently large such that neither the first mechanical finger 231 nor the second mechanical finger 232 physically engage the stored object.

Upon the load arms 210, 220 being arranged in a fully extended configuration such that the stored object is disposed on the load bed 201 in between the first and second outer arm elements 210a, 220a (e.g., the first and second arm interface portions 211, 221), one or more of the load arms 210, 220 may be configured to translate at least the outer arm element thereof (e.g., first outer arm element 210a, second outer arm element 220a) longitudinally (e.g., in a y-direction, as illustrated) into the load area (e.g., towards the opposing load arm) such that the arm interface portion thereof is physically pressed against at least a portion of the stored object. In various embodiments wherein the shuttle 10 comprises a first load arm 210 and a second load arm 220, one of the load arms may be configured to longitudinally translate the outer arm element thereof into the load area, as described, while the other load arm may comprise a longitudinally rigid configuration such that the longitudinally dynamic load arm may be used to functionally pin a captured object against the opposing rigid load arm during transportation of the shuttle.

Additionally, or alternatively, as shown in FIG. 3A, the first load arm 210 and the second load arm 220 may be configured to longitudinally translate the first outer arm element 210a and the second outer arm element 220a, respectively, in opposite directions into the load area such that the stored object disposed on the load bed 201 is physically engaged on opposing sides thereof by the first arm interface portion 211 and the second arm interface portion 221. For example, as illustrated, upon the first and second load arms 210, 220 being extended into the storage location such that the stored object is positioned within the load area, the first outer arm element 210a of the first load arm 210 may be configured to selectively move in the first longitudinal direction 301 (e.g., corresponding to the positive y-direction, as illustrated) in order for the first arm interface portion 211 to abut at least a portion of the object, and the second outer arm element 220a of the second load arm 210 may be configured to selectively move in the second longitudinal direction 302 (e.g., corresponding to the negative y-direction, as illustrated) opposite the first longitudinal direction 301 in order for the second arm interface portion 221 to abut against a portion of the object on the opposite side of the object. For example, as the first and second load arms 210, 220 are extending away from the shuttle body 101 (e.g., in the negative x-direction, as illustrated), the first arm interface portion 211 and the second arm interface portion 221 are separated by a first separation distance configured such that the distance between the first mechanical finger 231 and the second mechanical finger 232 is at least substantially larger than the width of the stored object. Upon the first arm interface portion 211 and the second arm interface portion 221 being laterally translated in the first and second longitudinal directions 301, 302, respectively, the first arm interface portion 211 and the second arm interface portion 221 may be separated by a second separation distance that is at least substantially smaller than the first separation distance and configured to be at least substantially equal to the width of the object such that the distance between the first mechanical finger 231 and the second mechanical finger 232 is at least substantially smaller than the width of the object. In such an exemplary circumstance, the longitudinally dynamic configuration of the first and second load arms 210, 220 may allow the shuttle 10 to avoid unwarranted physical interference between the rigid mechanical fingers 231, 232 and the stored object as the load arms 210, 220 are laterally extended in an extension direction (e.g., in the negative x-direction, as illustrated) into the storage location, while effectively utilizing both the first and second mechanical fingers 231, 232 during retraction of the load arms 210, 220 to engage the captured object and at least partially stabilize the object on the load bed 201 as the first and second load arms 210, 220 are retracted in a retraction direction (e.g., in the positive x-direction, as illustrated) towards the shuttle body 101. The rigid configuration of the mechanical fingers 231, 232 at least partially restricts the relative movement between the captured object and the load bed 201 by preventing the captured object from moving relative to the load bed 201 in the opposite lateral direction (e.g., in the negative x-direction, as illustrated) as the load arms 210, 220 are being retracted in the retraction direction from the storage location back towards the shuttle body 101.

In various embodiments, wherein at least a portion of each of the first load arm 210 and the second load arm 220 were laterally translated into the load area while the load arms 210, 220 were in an extended configuration to engage the captured object disposed therein, the first load arm 210 and the second load arm 220 may each be further configured to laterally translate the outer arm element thereof in the opposite longitudinal direction away from the opposing load arm in order to selectively disengage the captured object disposed on the load bed 201. For example, as illustrated in FIG. 3B, upon the first and second load arms 210, 220 being fully retracted back to the retracted configuration such that the object has been retrieved from the storage location back to shuttle body 101 of the shuttle 10, at least the first outer arm element 210a of the first load arm 210 may be configured to move in the third longitudinal direction 303 (e.g., corresponding to the negative y-direction, as illustrated) in order for the first arm interface portion 211 to disengage the at least a portion of the object, and the second outer arm element 220a of the second load arm 210 may be configured to selectively move in the fourth longitudinal direction 304 (e.g., corresponding to the positive y-direction, as illustrated) opposite the third longitudinal direction 303 in order for the second arm interface portion 221 to disengage the opposite side of the object. In various embodiments, upon the first and second load arms 210, 220 undergoing such a lateral translation in the retracted configuration, the separation distance between the first arm interface portion 211 and the second arm interface portion 221 may return to being at least substantially equal to the first separation distance, as described above, exhibited by the plurality of load arms 210, 220 during the extension of the load arms 210, 220 into the storage location (e.g., towards an extended configuration).

As described herein, in various embodiments, an exemplary load arm of a material handling system 200 may extend and retract (e.g., between an extended configuration and a retracted configuration) by moving the interconnected arm elements thereof relative to one another along an at least substantially linear guide track such that the outer arm element thereof is moved along a linear travel path in an at least substantially lateral direction. For example, the exemplary shuttle illustrated in FIGS. 3A and 3B may comprise a first load arm 210 and a second load arm 220 that expand and retract by moving along respective linear travel paths that define the linear motion of the respective load arms 210, 220 between the retracted and expanded configurations. For example, in various embodiments wherein a load arm, such as, for example, a first load arm 210, comprises a rigidly configured mechanical finger 231 positioned at a distal end thereof the first load arm 210 may be configured to move along a linear track between a retracted configuration and an extended configuration and accommodate the need for a change in load width by selectively executing a longitudinal translation of at least the first outer arm element 210a thereof either into or away from the load area (e.g., in either the first longitudinal direction 101 or the third longitudinal direction 303), as needed. Additionally, or alternatively, in various embodiments, the material handling assembly 200 may be configured such that an exemplary load arm may be extended and retracted (e.g., between an extended configuration and a retracted configuration) by moving the interconnected arm elements thereof relative to one another along a guide track comprising at least one non-linear track portion configured to dynamically adjust the load width of the load area as the outer arm element of the load arm travels (e.g., extends and/or retracts) through the non-linear portion of the guide track. material handling assembly 200 that the load width of the cause the load width to extend in an at least substantially linear (e.g., lateral) direction. For example, an exemplary load arm may travel along a guide track comprising one or more curved features, such as, for example, an at least partially s-shaped curve, that connects a first lateral track portion to a second lateral track portion that extends in the same lateral direction as the first lateral track portion, but is longitudinally offset therefrom in a position at least substantially closer to the opposing load arm than the first lateral track portion.

As a non-limiting example, FIG. 3C illustrates an exemplary material handling assembly 200 wherein both the first load arm 210 and the second load arm 220 are moved between their respective retracted and extended configurations along a guide track that is defined at least in part by a non-linear track portion. For example, as illustrated, the first load arm 210 may travel along an at least partially non-linear guide track configured that causes the first load arm 210 to exhibit a corresponding first non-linear travel path 305 as it moves between a retracted configuration and an extended configuration. The at least partially non-linear guide track may comprise a curved portion configured such that as the first load arm 210 is being extended and the first outer arm element 210a travels through a curved portion 305a of the first non-linear travel path 305 and away from the shuttle body 101 towards the extended configuration, the first outer arm element 210a is shifted longitudinally towards (e.g., into) the load area (e.g., towards the opposing second load arm 220). In various embodiments, for example, such a non-linear guide track may be configured to cause the first outer arm element 210a (e.g., the first arm interface portion 211) travelling there along to be longitudinally shifted towards the load area in order to decrease the load width of the load area to a width that is at least substantially equal to the width of a stored object being retrieved from a storage location. In various embodiments, such an exemplary configuration facilitates the engagement of the first mechanical finger 231 with the stored object for executing the retrieval operation. Conversely, as the first load arm 210 is retracted and the first outer arm element 210a is moved in the opposite direction (e.g., towards a retracted configuration) along the first non-linear travel path 305, the first outer arm element 210a is shifted in the opposite longitudinal direction away from the load area (e.g., in the negative y-direction, as illustrated) as it travels through the curved portion 305a of the first non-linear travel path 305. The first non-linear travel path 305 is configured such that as the first load arm 210 is approaching a fully retracted configuration wherein the captured object disposed on a load bed 201 is positioned within the shuttle body 101, the first outer arm element 210a is longitudinally shifted away from the load area, causing the first arm interface portion 211 of the first load arm 210 to disengage the captured object.

As described herein, in such an exemplary circumstance wherein the non-linear guide track causes the first outer arm element 210a to travel along the first non-linear travel path 305 such that, as the first load arm 210 is extending, the load width of the load area is decreased to be at least substantially similar to the width of the stored object, the first mechanical finger 231 may comprise a one-way hinged configuration in order to allow the first mechanical finger 231 to be rotated towards a retracted position and avoid unwarranted physical interference caused by the first mechanical finger 231 being forced into the stored object (e.g., as the first load arm 210 is still expanding).

In various embodiments, as illustrated in FIG. 3C, both the first load arm 210 and the second load arm 220 may be configured for movement along at least partially non-linear guide tracks such that the respective outer arm elements 210a, 220a thereof exhibit the illustrated first non-linear travel path 305 and second non-linear travel path 306, respectively. As described above, the first non-linear travel path 305 and the second non-linear travel path 306 may include a first curved feature 305a and a second curved feature 306a, respectively, each corresponding to a longitudinal shift in the respective outer arm element 210a, 220a travelling there along. In various embodiments, the respective curved features 305a, 306a defined along the first non-linear travel path 305 and the second non-linear travel path 306 may be at least substantially symmetrical to one another over a lateral axis of symmetry provided therebetween. The material handling assembly 200 may be configured such that as the first and second load arms 210, 220 are extended and the first outer arm element 210a and the second outer arm element 220a are moved along the first and second non-linear travel paths 305, 306, respectively, the first arm interface portion 211 and the second arm interface portion 221 are each longitudinally shifted towards the load area (e.g., towards one another) so as to decrease the separation distance therebetween to a distance that is at least substantially similar to the width of the stored object. Conversely, as the first load arm 210 and the second load arm 220 are retracted and the first and second outer arm elements 210a, 220a are moved in the opposite direction (e.g., towards a retracted configuration) along the respective first and second non-linear travel paths 305, 306, the first outer arm element 210a and the second outer arm elements 220a each exhibit a longitudinal shift away from the load area as they travels through the first and second curved features 305a, 306a of the respective non-linear travel paths 305, 306. Collectively, the first and second non-linear travel paths 305, 306 may be configured such that as the first and second load arms 210, 220 are approaching a fully retracted configuration wherein a captured object disposed on a load bed 201 is positioned within the shuttle body 101, the first and second load arms 210, 220 are each longitudinally shifted away from the load area, causing the first arm interface portion 211 of the first load arm 210 and the second arm interface portion 221 of the second load arm 220 to disengage the captured object. As described herein, in such an exemplary circumstance, the non-linear (e.g., curved) features of the guide tracks corresponding to the first and second non-linear travel paths 305, 306 along which the first and second load arms 210, 220 extend and retract embody a mechanical means of facilitating the selective engagement of a stored object by one or more load arms (e.g., an arm interface portion thereof) for executing a retrieval operation and, further, the selective disengagement of the captured object by the one or more load arms for releasing the object at a shuttle body of the shuttle.

Figure 4A:
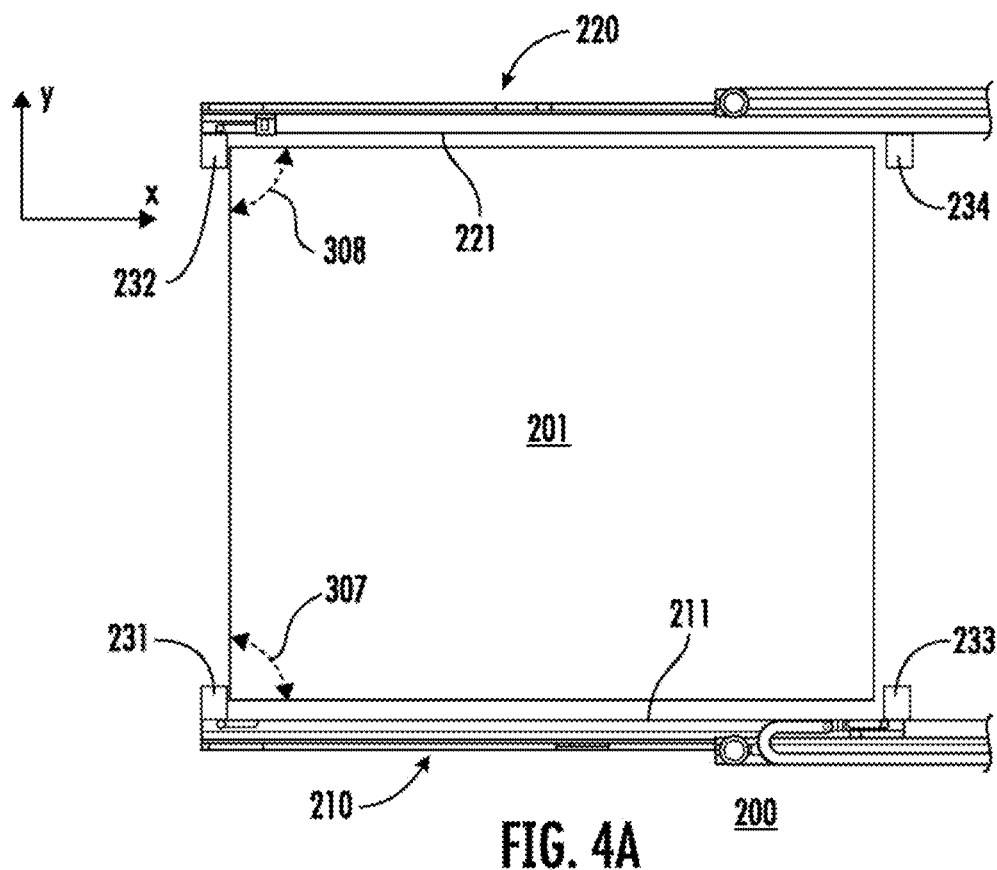
FIGS. 4A-4B illustrate various top views of exemplary shuttle apparatuses according to various embodiments described herein.
Figure 4B:
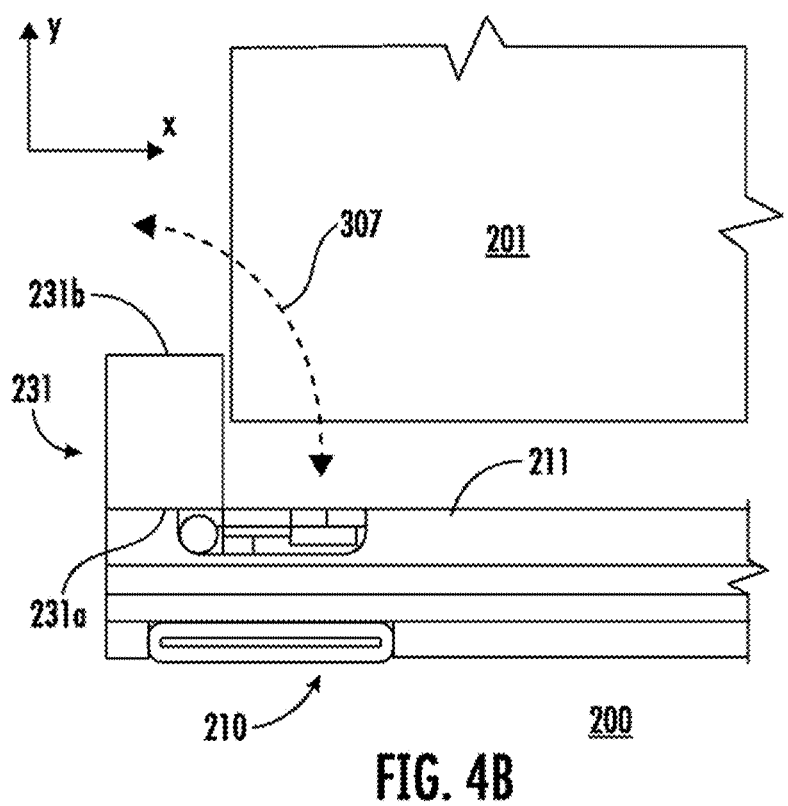

In various embodiments, as described herein, an exemplary retrieval operation for retrieving a stored object from a storage location within an AS/RS using an exemplary shuttle may be executed using a shuttle with a material handling assembly comprising at least one retractable load arm that includes a mechanical finger provided at a distal end of the load arm (e.g., at a distal end of an outer arm element) for facilitating deliberate physical engagement with the object provided in the load area as the load arm is being retracted from the storage location back to the shuttle body (e.g., to a retracted configuration). In various embodiments, a mechanical finger of an exemplary shuttle may comprise an at least partially retractable mechanical finger comprising a spring component and a one-way hinge element that enable the mechanical finger to be rotationally retracted into an adjacent portion of the load arm (e.g., the outer arm element) upon being physically engaged by a stored object as the load arm is being extended into the storage location. In various embodiments, as illustrated in FIGS. 4A and 4B, an exemplary shuttle may comprise a material handling assembly 200 comprising a first load arm 210 comprising a first mechanical finger 231 provided at a distal end thereof and protruding away from the first arm interface portion 211 into the load area (e.g., in the positive y-direction, as illustrated). Further, the material handling assembly 200 may comprise a second load arm 220 comprising a second mechanical finger 232 provided at a distal end thereof and protruding away from the second arm interface portion 221 into the load area (e.g., in the negative y-direction, as illustrated). As illustrated in FIG. 4A, the first mechanical finger 231 and the second mechanical finger 232 comprise retractable mechanical fingers that are hingedly connected to the first load arm 210 and the second load arm 220, respectively, such that first and second mechanical fingers 231, 232 are each configured to move between a nominal expanded finger position and a retracted finger position, as described herein, by rotating through a horizontal rotational plane (e.g., a plane of rotation that is at least substantially parallel to the load bed 201) about a respective vertical hinge axis. For example, as illustrated, based at least in part on the configuration of the one-way hinge component of the first mechanical finger 231, the first mechanical finger 231 may be arranged in an expanded finger position defined by the first mechanical finger 231 extending from the first arm interface portion 211 into the load area in a longitudinal direction that is at least substantially perpendicular to the arm length of the first load arm 210. Further, the first mechanical finger 231 may be arranged in a retracted finger position defined by the first mechanical finger 231 being positioned at least partially within the first load arm 210 (e.g., within the first outer arm element 210a) by extending in a lateral direction that is at least substantially parallel to the arm length of the first load arm 210 such that the first mechanical finger 231 is retracted from the load area and disposed within the first load arm 210.

In various embodiments, a retractable mechanical finger comprising a one-way hinge component, such as, the first mechanical finger 231 and/or the second mechanical finger 232, may comprise at least one spring element configured to facilitate the rotational movement of the mechanical finger relative to the load arm to which the mechanical finger is secured between the expanded finger position and the retracted finger position. For example, in various embodiments, the at least one spring element of the first mechanical finger 231 may be configured to generate a spring force that acts on the first mechanical finger 231 so as to impart a first expansion moment corresponding to an expansion rotational direction (e.g., a rotational direction about the vertical hinge axis that extends from the retraction finger position towards the expanded finger position) onto the first mechanical finger 231, such as, for example, with respect to the first mechanical finger 231, in the counterclockwise direction, from the top perspective shown in FIGS. 4A-4B. For example, in various embodiments, the at least one spring element of an exemplary mechanical finger may be configured to bias the mechanical finger towards the expanded finger position by applying an at least substantially constant spring force to the mechanical finger. Further, as described herein, as the at least one spring elements of the first mechanical finger 231 act to bias the first mechanical finger 231 towards an expansion rotational direction, the one-way hinge component of the first mechanical finger 231 illustrated in FIGS. 4A-4B may be configured to prevent the first mechanical finger 231 from rotating in the expansion rotational direction beyond the expanded finger position. Accordingly, the one-way hinge component and the at least one spring elements of the first mechanical finger 231 collectively function to define the expanded finger position as the nominal configuration of the first mechanical finger 231. Such an exemplary mechanical finger 231, 232, as described herein, may be configured such that, in order to cause the mechanical finger to be pivoted about the vertical hinge axis from the expanded finger position towards the retracted finger position, a secondary force (e.g., moment) that is at least substantially greater than the spring force from the at least one spring elements and acts on the finger 231, 232 in the retraction rotational direction may be required.

FIG. 4B illustrates the first mechanical finger 231 of the exemplary material handling assembly 200 shown in FIG. 4A in an expanded finger position, wherein the first mechanical finger 231 comprises a hinged mechanical finger comprising a one-way hinge component and at least one spring element. In various embodiments, the first mechanical finger 231 may comprise an at least substantially linear component defined by a finger length that extends between a first finger end 231a and a second finger end 231b. As shown, the first mechanical finger 231 may by hingedly connected to the outer arm element 210a of the first load arm 210 at the first finger end 231a thereof. In various embodiments wherein the first mechanical finger 231 is configured in an at least partially expanded configuration (e.g., a fully expanded configuration), the second finger end 231b thereof is disposed within the load area. As described herein, based at least in part on various forces acting thereon, such as, for example, a spring force being applied from a spring element of the first mechanical finger 231 to position the finger 231 in a nominal expanded finger position and/or a pushing force acting on the first mechanical finger 231 such that a moment is imparted on the finger 231 in the retraction rotational direction (e.g., a clockwise rotational direction, as viewed from the illustrated top perspective of the shuttle), the first mechanical finger 231 may rotate through a first rotational range of motion 307 defined between the illustrated fully expanded finger position, wherein the finger length of the first mechanical finger 231 extends at least substantially perpendicularly to the arm interface portion 211 of the first load arm 210, and the fully retracted finger position, wherein the second finger end 231b is positioned at least substantially adjacent the first arm interface portion 211 such that the first mechanical finger is retracted from the load area into the first load arm 210 and the finger length of the first mechanical finger 231 is at least substantially parallel to the length of the outer arm element 210a of the first load arm 210.

As an illustrative example, an exemplary shuttle comprising the exemplary material handling assembly 200 shown in FIGS. 4A-4B may be configured to execute a retrieval operation, as described herein. Upon the shuttle being aligned with the storage location containing the stored object, the first and second load arms 210, 220 may each be extended from a retracted configuration an outward lateral direction (e.g., in the negative x-direction, as illustrated) away from the shuttle body towards the storage location. For example, in an exemplary circumstance wherein the material handling assembly 200 comprises an at least partially retractable mechanical finger provided at the distal end of one or more of the load arms 210, 220, such as, for example, the first and second mechanical fingers 231, 232, the first and second load arms 210, 220 may be configured to extend in parallel linear directions such that the respective arm interface portions 211, 221 thereof are separated by a longitudinal distance that is at least substantially similar to the width of the stored object in the storage location. That is, the longitudinal distance between the first and second mechanical fingers 231, 232 is at least substantially smaller than the width of the object. As such, as the first and second load arms 210, 220 are extended into the storage location and the first and second mechanical fingers 231, 232 continue to travel in the outward lateral direction into the storage location, the outermost portions of both the first and second mechanical fingers 231, 232 may physically engage the stored object. In such an exemplary circumstance, as the first and second mechanical fingers 231, 232 continue to move relative to the stored object in the outward lateral direction, the static object may apply a pushing force on each of the first and second mechanical fingers 231, 232 that opposes the lateral movement of the mechanical fingers 231, 232 caused by the extension of the first and second load arms 210, 220 into the storage location. For example, a force may be acting on each of the first and second mechanical fingers 231, 232 in the positive-x direction, as illustrated, which may impart a first retraction moment and a second retraction moment on the first and second mechanical fingers 231, 232, respectively. In various embodiments, the hinged connection of the first and second mechanical fingers 231, 232 to the first and second load arms 210, 220, respectively, enables each of the mechanical fingers 231, 232 to be rotated along the respective range of rotational movement 307, 308 in a retraction rotational direction towards an adjacent portion of the arm interface portion 211, 212. As the first and second load arms 210 continue to extend into the storage location towards an extended configuration, the stored object continues to move relative to the first and second mechanical fingers 231, 232 and may continue to remain engaged with the mechanical fingers 231, 232 until the load arms 210, 220 extend into the storage location such that the mechanical fingers 231, 232 move beyond the stored object. In various embodiments, as the mechanical fingers 231, 232 continue to move relative to the object and while the object remains engaged with the mechanical fingers 231, 232, the object may continue to cause each of the mechanical fingers 231, 232 to rotate further towards their respective retracted finger positions. In various embodiments based at least in part on the configuration of the stored object, one or more of the mechanical fingers 231, 232 may be pushed by the stored object into a fully retracted finger position wherein at least substantially all of the mechanical finger is retracted within the load arm connected thereto.

In various embodiments, as described herein, the first and second mechanical fingers may comprise at least one spring element configured to apply a spring force to the respective mechanical finger 231, 232 so as to bias the finger 231, 232 in the expansion rotational direction (e.g., towards the expanded finger position). Upon the first and second load arms 210, 220 being extended into the storage location such that the first and second mechanical fingers 231, 232 are moved past the stored object (e.g., beyond the depth of the stored object) the object may disengage the first and second mechanical fingers 231, 232 and, based at least in part on the spring-loaded configuration thereof, the first and second mechanical fingers 231, 232 may each move along their respective range of rotational movements 307, 308 in an expansion rotational direction until the fingers 231, 232 reach the expanded finger position, as illustrated.

Upon the first and second load arms 210, 220 being arranged in a fully extended configuration such that the stored object is disposed within the load area (e.g., on the load bed 201) in between the first and second outer arm elements 210a, 220a (e.g., the first and second arm interface portions 211, 221), the material handling assembly 200 may be configured to retract the first and second load arms 210, 220 in the opposite lateral direction (e.g., in the positive x-direction, as illustrated) in order to bring the captured object back to the shuttle body. The first and second load arms 210, 220 may be retracted such that the first and second mechanical fingers 231, 232 secured thereto are similarly moved in the opposite lateral direction. In various embodiments, as the first and second mechanical fingers 231, 232 continue to travel in the inward lateral direction towards the shuttle body, the innermost portions of both the first and second mechanical fingers 231, 232 may physically engage the captured object disposed within the load area. In various embodiments, based at least in part on the one-way hinge component of each mechanical finger 231, 232, the first and second mechanical fingers 231, 232 do not rotate in their respective expansion rotational directions upon physically engaging the captured object, but rather, the mechanical fingers 231, 232 remain fixed in their respective expanded finger positions and thus, remain engaged with the captured object such that the fingers 231, 232 may cause the object to move with the load arms 210, 220 back towards the shuttle body. In various embodiments, an exemplary retractable mechanical finger comprising a hinged configuration, such as, for example, the exemplary first mechanical finger 231 shown in FIGS. 4A-4B, may be configured to at least substantially minimize the amount of load arm longitudinal movement required in order for a material handling assembly to execute a retrieval operation by enabling the stored object to pass through the hinged mechanical finger with minimal physical interference as the load arm is being extended into the storage location, rather than having to longitudinally move one or more of the support arms to accommodate an object width or utilize electronic, motor-drive fingers that are selectively expanded upon the load arm being fully extended into the storage location.

Figure 5A:
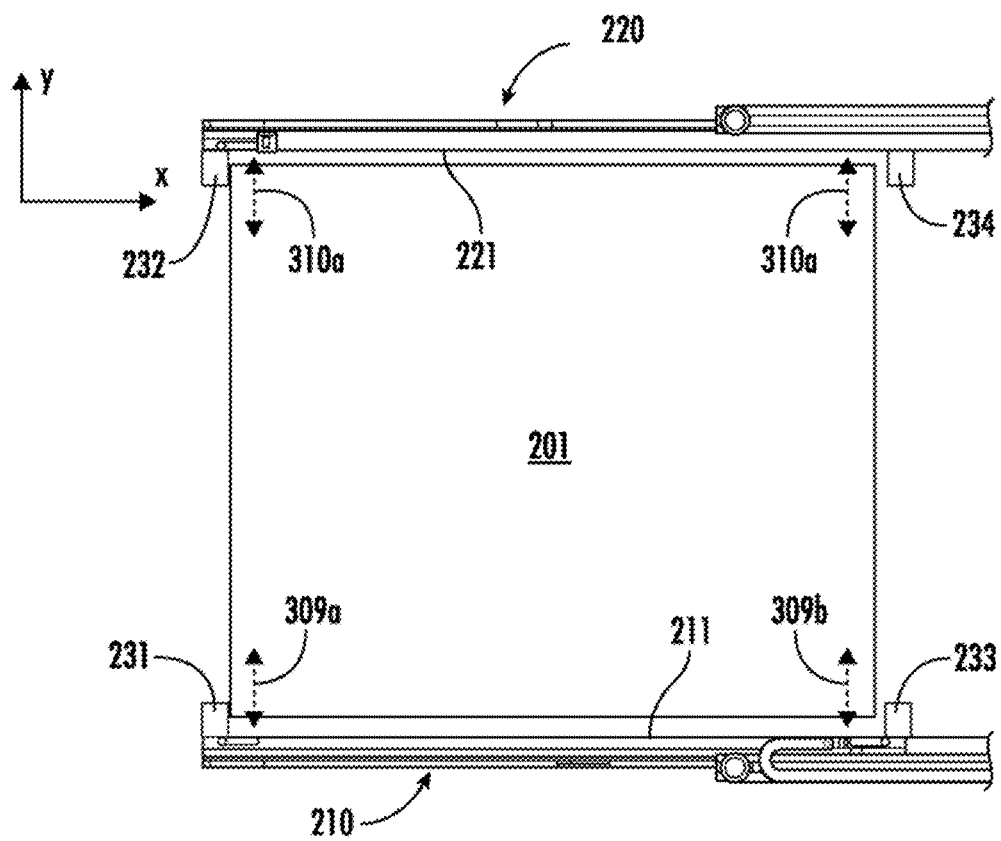
FIGS. 5A-5B illustrate various top views of exemplary shuttle apparatuses according to various embodiments described herein.
Figure 5B:
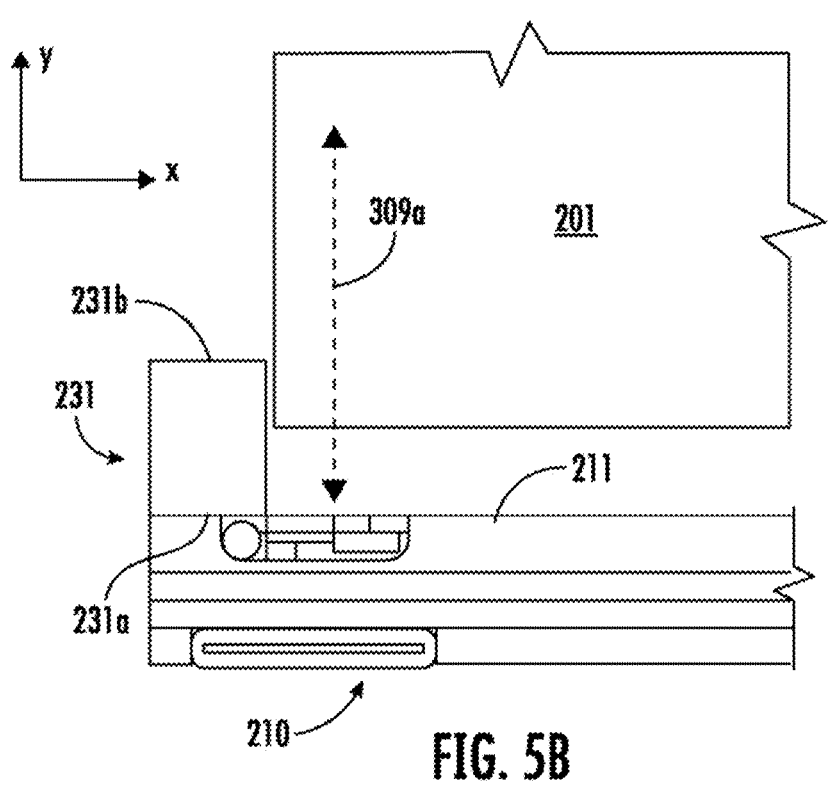

As described herein, in various embodiments, an exemplary mechanical finger may have an at least partially retractable configuration such that the mechanical finger may be at least partially retracted toward the load arm (e.g., the outer arm element) to which the finger is secured based at least in part on the finger physically engaging at least a portion of an object disposed in the load area on the load bed 201. For example, as illustrated in FIGS. 5A-5B, in various embodiments, a shuttle may comprise a material handling assembly 200 comprising one or more (e.g., a plurality) of mechanical fingers (e.g., a first mechanical finger 231, a second mechanical finger 232, a third mechanical finger 233, and a fourth mechanical finger 234) that are provided along an arm interface portion of a load arm and comprise an at least partially retractable configuration defined by a range of relative linear movement between the mechanical finger and the load arm connected thereto. As illustrated in FIG. 5A, the first mechanical finger 231 and the third mechanical finger 233 comprise retractable mechanical fingers that are provided along the arm length of the first load arm 210 (e.g., adjacent opposing lateral sides of the load bed), and the second mechanical finger 232 and fourth mechanical finger 234 comprise retractable mechanical fingers that are provided along the arm length the second load arm 220. As shown, each of the plurality of mechanical fingers 231, 232, 233, 234 is configured to move between a nominal expanded finger position and a retracted finger position, as described herein, by moving in a respective longitudinal direction perpendicularly into and/or out of the respective load arm to which the finger is connected. For example, as illustrated, a first mechanical finger 231 may be arranged in an expanded finger position defined by the first mechanical finger 231 extending from the first arm interface portion 211 into the load area in a longitudinal expansion direction (e.g., the positive y-direction, as illustrated) that is at least substantially perpendicular to the arm length of the first load arm 210. Further, the first mechanical finger 231 may be arranged in a retracted finger position defined by the finger length of the first mechanical finger 231 being positioned at least partially within the first load arm 210 (e.g., within the first outer arm element 210a) by being moved in a longitudinal retraction direction that is opposite from the longitudinal expansion direction such that the finger length of the first mechanical finger 231 is retracted from the load area and disposed within the first load arm 210. As shown in FIG. 5A, each of the plurality of mechanical fingers 231, 232, 233, 234 are configured to move between a respective expanded finger position and retracted finger position such that each of the retractable fingers defines a respective a range of relative linear movement that extends linearly in a longitudinal direction between the extended and retracted finger positions described above. For example, as illustrated, the first mechanical finger 231 may be configured to move along a first range of linear movement 309a, the second mechanical finger 232 may be configured to move along a second range of linear movement 309b, the third mechanical finger 233 may be configured to move along a third range of linear movement 310a, and the fourth mechanical finger 234 may be configured to move along a fourth range of linear movement 310b.

In various embodiments, wherein an exemplary shuttle 10 comprises a first load arm 210 and a second load arm 220, the plurality of mechanical fingers 230 may comprise a first set of mechanical fingers, including a first mechanical finger 231 and a second mechanical finger 232 provided at distal ends of the first load arm 210 and a second load arm 220, respectively, that are configured to facilitate the retrieval of an object by causing an object provided in the load area to be pulled towards the shuttle body 101 as the load arms 210, 220 are retracted. Further, the plurality of mechanical fingers 230 may comprise a second set of mechanical fingers, including a third mechanical finger 233 and a fourth mechanical finger 234 provided at the opposing lateral ends of the respective first and second outer arm elements 210a, 220a relative to the respective distal portions (e.g., at least substantially adjacent a second lateral side of the load bed 201) of the first load arm 210 and a second load arm 220, respectively. In various embodiments, such third and further mechanical fingers 233, 234 may be configured to facilitate the dispense and/or storage of an object by causing the object being held at the shuttle body to be pushed in an outward lateral direction away from the shuttle body 101 (e.g., toward a storage location) as the load arms 210, 220 are extended. In such an exemplary circumstance, the exemplary shuttle embodiments and configurations described herein with respect to the retrieval of a stored object from a storage location may be applied with respect to such exemplary third and fourth mechanical fingers 233, 234 to facilitate execution of an exemplary storage operation.

As described herein with respect to the exemplary retractable mechanical fingers comprising a one-way hinged configuration, the exemplary retractable mechanical fingers comprising a linear retraction configuration, as illustrated in FIGS. 5A and 5B, may comprise at least one spring element configured to facilitate the linear movement of the mechanical finger between the expanded finger position and the retracted finger position. For example, in various embodiments, the at least one spring element of the first mechanical finger 231 may be configured to generate a spring force that acts on the first mechanical finger 231 in an expansion direction. For example, in various embodiments, the at least one spring element of an exemplary mechanical finger may be configured to bias the mechanical finger towards the expanded finger position by applying an at least substantially constant spring force to the mechanical finger. Further, as described herein, as the at least one spring elements of the first mechanical finger 231 act to bias the first mechanical finger 231 towards an expansion direction.

FIG. 5B illustrates the first mechanical finger 231 of the exemplary material handling assembly 200 shown in FIG. 5A in an expanded finger position, wherein the first mechanical finger 231 comprises a retractable mechanical finger configured for a linear retraction movement along first range of linear movement 309a. In various embodiments, the first mechanical finger 231 may comprise an at least substantially linear component defined by a finger length that extends between a first finger end 231a and a second finger end 231b. As shown, the first mechanical finger 231 may by connected to the outer arm element 210a of the first load arm 210 such that the mechanical finger 231 may be longitudinally translated into and out of the first load arm 210 in response to one or more forces acting thereon (e.g., from a stored object within a storage location). In various embodiments wherein the first mechanical finger 231 is configured in an at least partially expanded configuration (e.g., a fully expanded configuration), the second finger end 231b thereof is disposed within the load area. As described herein, based at least in part on various forces acting thereon, such as, for example, a spring force being applied from a spring element of the first mechanical finger 231 to position the finger 231 in a nominal expanded finger position and/or a pushing force acting on the first mechanical finger 231 such that the finger 231 is pushed in the retraction direction (e.g., in the negative y-direction, as illustrated), the first mechanical finger 231 may move along the first range of linear movement in the retraction direction such that the second finger end 231b is moved towards the surface of the arm interface portion 211. In various embodiments, such an exemplary mechanical finger 231 may be engaged by an object such that it is moved to a retracted finger position, wherein the second finger end 231b is positioned at least substantially adjacent the first arm interface portion 211 such that the first mechanical finger 231 is retracted from the load area into the first load arm 210.

Figure 6:
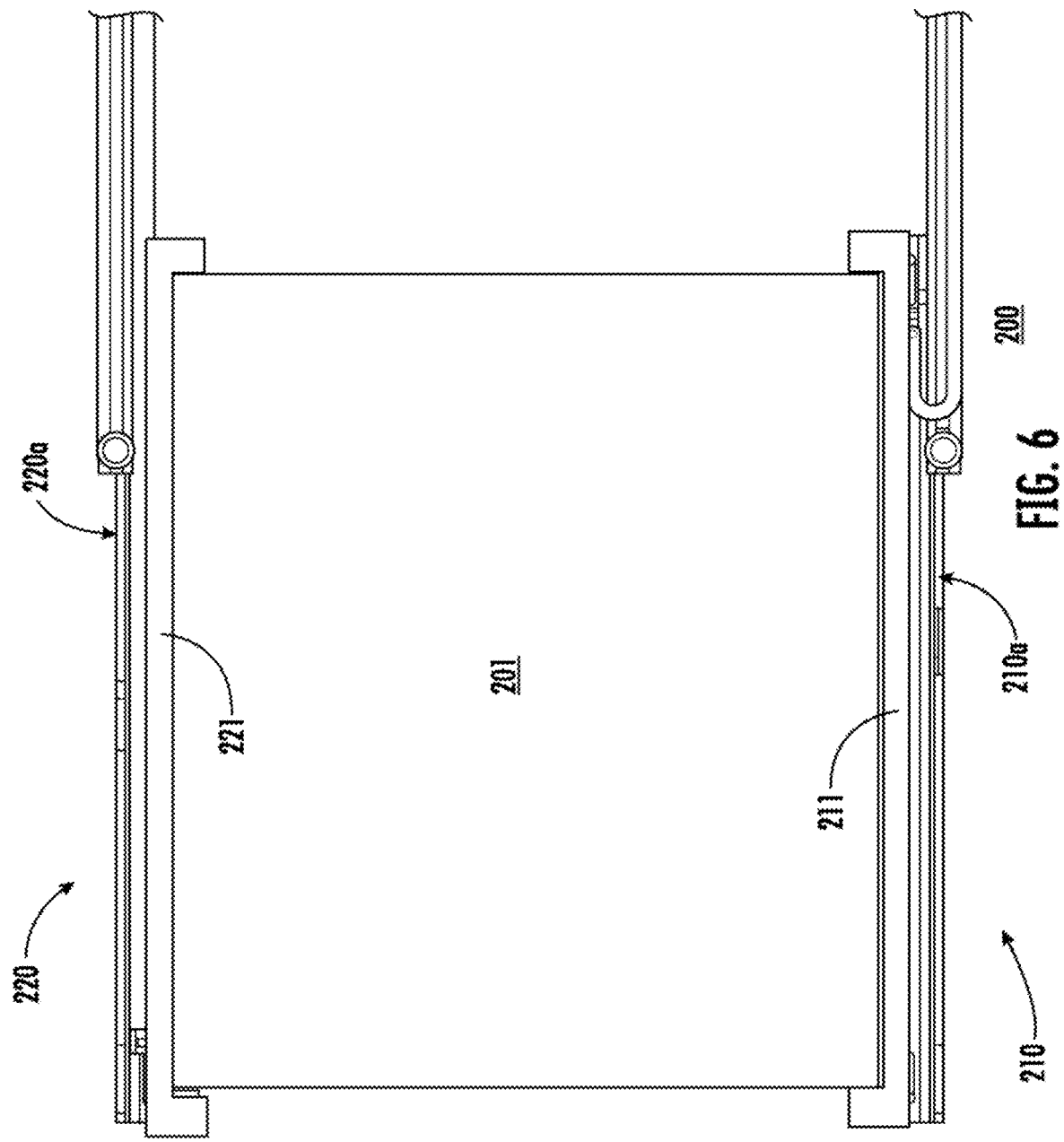
FIG. 6 illustrates a top view of an exemplary shuttle apparatus according to various embodiments described herein.

In various embodiments, an exemplary shuttle may comprise a material handling assembly 200 that does not include any mechanical fingers configured to facilitate the handling of an object disposed within the load area, as described herein. For example, as illustrated in FIG. 6, the exemplary material handling assembly 200 comprises a first load arm 210 comprising an outer arm element 210a that includes a first arm interface portion 211 that is made from an at least substantially compliant material configured to facilitate the stabilization of an object engaged therewith in one or more directions. For example, in various embodiments, a first arm interface portion 211 may comprise an at least one or more longitudinal protrusion portions extending in an at least partially perpendicular direction relative to the arm length of the first load arm 210 and configured to facilitate the constraint of an object engaged therewith in one or more lateral directions. For example, in various embodiments, the soft, malleable, moldable, manipulatable, and/or otherwise compliant material described herein may be used to at least substantially maximize the amount of surface area of the first arm interface portion 211 that is engaged with an object disposed within the load area. In particular, such an exemplary arm interface portion 211 may be utilized to effectively accommodate the retrieval, disposal, and/or transportation of objects having extraordinary and/or unique size, shape, or other features. Further, as illustrated, in various embodiments a materials handling assembly 200 may comprise a first load arm 210 and a second load arm 220, each comprising an exemplary arm interface portion (e.g., first arm interface portion 211, second arm interface portion 221) the does not include any mechanical fingers protruding therefrom, but rather, may comprise an at least partially compliant material configured to facilitate effective handling of a captured object disposed on the load bed 201. Further, in various embodiments, one or more of the first and second load arms 210, 220 of a material handling assembly 200 that includes a first arm interface portion 211 and a second arm interface portion 221 made of an at least substantially compliant material without any mechanical fingers, may be configured to selectively move in a respective longitudinal direction towards the load arca in order for the corresponding arm interface portion 211, 221 of the one or more load arms 210, 220 to abut at least a portion of the object disposed within the load area.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A shuttle configured for use in an automated storage and retrieval system, the shuttle comprising:
   a plurality of retractable load arms at least partially secured relative to a shuttle body and configured to be extendable between a retracted configuration and an extended configuration, the plurality of retractable load arms configured to extend at least substantially away from the shuttle body in a lateral direction, wherein each load arm extends in the lateral direction along a guide track configured to define a load arm travel path of each load arm between the retracted configuration and the extended configuration, wherein at least a portion of the guide track is defined by a non-linear feature configured to cause the at least the portion of each load arm to exhibit a longitudinal shift in a longitudinal direction from a first longitudinal position to a second longitudinal position as each load arm travels along the guide track in one of an extension direction or a retraction direction; and
   a retractable mechanical finger provided at a distal portion of each load arm of the plurality of retractable load arms and configured to facilitate handling of at least one object.

2. The shuttle of claim 1, wherein the retractable mechanical finger is configured to rotate from an expanded finger position in a retraction rotational direction at least partially towards a retracted finger position in response to a first retraction moment being imparted on the retractable mechanical finger in the retraction rotational direction.

3. The shuttle of claim 1, wherein an expanded finger position is defined by a finger length of the retractable mechanical finger extending from a first load arm and into a load area in an at least substantially perpendicular direction relative to an arm length of the first load arm, and wherein a retracted finger position is defined by the retractable mechanical finger being retracted into the first load arm such that the finger length of the retractable mechanical finger extends at least substantially parallel to the arm length of the first load arm.

4. The shuttle of claim 1, wherein at least one spring element of the retractable mechanical finger is configured to bias the retractable mechanical finger towards an expanded finger position by applying a spring force to the retractable mechanical finger that imparts a first expansion moment on the retractable mechanical finger in an expansion rotational direction.

5. The shuttle of claim 1 further comprising a second retractable mechanical finger that is configured to facilitate handling of the at least one object, the second retractable mechanical finger being hingedly connected to a second load arm and comprising at least one second spring element that facilitates rotational movement of the second retractable mechanical finger relative to the second load arm between a second expanded finger position and a second retracted finger position, wherein the second retractable mechanical finger is hingedly connected to the second load arm using a second one-way hinge component configured to at least partially define a second range of rotational movement of the second retractable mechanical finger relative to the second load arm.

6. The shuttle of claim 5, wherein the at least one second spring element of the second retractable mechanical finger is configured to bias the second retractable mechanical finger towards the second expanded finger position by applying a second spring force to the second retractable mechanical finger that imparts a second expansion moment on the second retractable mechanical finger in a second expansion rotational direction, wherein an expansion rotational direction defined by the retractable mechanical finger and the second expansion rotational direction defined by the second retractable mechanical finger comprise at least substantially opposite rotational directions.

7. The shuttle of claim 1, wherein a one-way hinge component is defined at least in part by a vertical hinge axis such that a range of rotational movement of the retractable mechanical finger relative to a first load arm is defined in an at least substantially horizontal plane.

8. The shuttle of claim 7, wherein the at least substantially horizontal plane is at least substantially parallel a load bed.

9. The shuttle of claim 1, wherein a one-way hinge component is configured to, when the retractable mechanical finger is in an expanded finger position, prevent the retractable mechanical finger from being rotated in an expansion rotational direction away from a retracted finger position such that the one-way hinge component defines a rotational range of movement of the retractable mechanical finger relative to a first load arm by at least partially restricting a range of rotational movement in the expansion rotational direction.

10. The shuttle of claim 1, wherein at least a portion of a first load arm is configured to be selectively translated in a first longitudinal direction relative to a load area so as to dynamically adjust a load width of the load area in order to facilitate handling of the at least one object disposed on a load bed.

11. The shuttle of claim 1, wherein the plurality of retractable load arms comprise a first load arm and a second load arm, wherein the first load arm comprises an arm interface portion defined by a surface of the first load arm that is positioned at least substantially adjacent a load area and faces the second load arm so as to be configured for physical engagement of the at least one object disposed within the load area to at least partially secure the at least one object within the load area, wherein the arm interface portion is made of a high-traction material.

12. The shuttle of claim 11, further comprising a third retractable mechanical finger extending from the first load arm into the load area in a second longitudinal direction at least substantially parallel to an at least substantially perpendicular direction relative to the first load arm, wherein the retractable mechanical finger is positioned at least substantially adjacent a first lateral side of a load bed, and wherein the third retractable mechanical finger is positioned at least substantially adjacent a second lateral side of the load bed.

13. The shuttle of claim 11, further comprising a fourth retractable mechanical finger configured to facilitate handling of the at least one object, the fourth retractable mechanical finger extending from the second load arm into the load area in an at least substantially perpendicular direction relative to the second load arm, wherein a second retractable mechanical finger is positioned at least substantially adjacent the first lateral side of a load bed, and wherein the fourth retractable mechanical finger is positioned at least substantially adjacent the second lateral side of the load bed.

14. A shuttle configured for use in an automated storage and retrieval system, the shuttle comprising:
a plurality of retractable load arms at least partially secured relative to a shuttle body and configured to be extendable between a retracted configuration and an extended configuration, the plurality of retractable load arms configured to extend at least substantially away from the shuttle body in a lateral direction, wherein each load arm extends in the lateral direction along a guide track configured to define a load arm travel path of each load arm between the retracted configuration and the extended configuration, wherein at least a portion of the guide track is defined by a non-linear feature configured to cause the at least the portion of each load arm to exhibit a longitudinal shift in a longitudinal direction from a first longitudinal position to a second longitudinal position as each load arm travels along the guide track in one of an extension direction or a retraction direction;
a first mechanical finger provided at a distal portion of each load arm and configured to facilitate handling of at least one object, the first mechanical finger extending from a first load arm of the plurality of retractable load arms into a load area in an at least substantially perpendicular direction relative to the first load arm; and
a second mechanical finger provided at a second distal portion of a second load arm of the plurality of retractable load arms and configured to facilitate handling of the at least one object, the second mechanical finger extending from the second load arm into the load area in an at least substantially perpendicular direction relative to the second load arm,
wherein at least a portion of one or more of the first load arm or the second load arm is configured to be selectively translated in a first longitudinal direction relative to the load area to dynamically adjust a load width of the load area to facilitate handling of the at least one object disposed on a load bed.

15. The shuttle of claim 14, wherein the first mechanical finger comprises an at least substantially rigid configuration.

16. The shuttle of claim 15, wherein the second mechanical finger comprises an at least substantially rigid configuration, and wherein at least a portion of the first load arm and at least a portion of second load are configured to be selectively translated in the first longitudinal direction and a second longitudinal direction relative to the load area, respectively, to dynamically adjust the load width of the load area to facilitate handling of the at least one object disposed on the load bed.

17. The shuttle of claim 14, wherein the first mechanical finger comprises an at least partially retractable configuration defined by a range of relative linear movement between the first mechanical finger and the first load arm, wherein the first mechanical finger is configured to at least partially retract from an expanded finger position in a longitudinal retraction direction towards a retracted finger position based at least in part on a pushing force applied to the first mechanical finger from the at least one object disposed within the load area.

18. The shuttle of claim 17 further comprises a mechanical element that comprises at least one spring element to facilitate linear movement of the first mechanical finger relative to the first load arm between the expanded finger position and the retracted finger position, the at least one spring element being configured to bias the first mechanical finger towards the expanded finger position by applying a spring force to the first mechanical finger in an at least substantially parallel direction relative to the first load arm.

19. The shuttle of claim 14, wherein the first mechanical finger is positioned at least substantially adjacent a first lateral side of the load bed, and wherein the second mechanical finger is positioned at least substantially adjacent a second lateral side of the load bed.

20. The shuttle of claim 14, wherein the first mechanical finger is hingedly connected to the first load arm using a one-way hinge component configured to at least partially defines a range of rotational movement of the first mechanical finger relative to the first load arm.

* * * * *